US012786720B2

(12) United States Patent
Reimann

(10) Patent No.: US 12,786,720 B2
(45) Date of Patent: Nov. 3, 2026

(54) DETECTION OF ATTACKS ON RADIO AUTHORIZATION SYSTEMS

(71) Applicant: LAMBDA:4 ENTWICKLUNGEN GMBH, Hamburg (DE)

(72) Inventor: Rönne Reimann, Hamburg (DE)

(73) Assignee: Lambda: 4 Entwicklungen GmbH, Hamburg (DE)

( * ) Notice: Subject to any disclaimer, the term of this patent is extended or adjusted under 35 U.S.C. 154(b) by 261 days.

(21) Appl. No.: 18/841,941

(22) PCT Filed: Feb. 28, 2022

(86) PCT No.: PCT/EP2022/055016

§ 371 (c)(1),
(2) Date: Aug. 27, 2024

(87) PCT Pub. No.: WO2023/160828

PCT Pub. Date: Aug. 31, 2023

(65) Prior Publication Data

US 2025/0184737 A1 Jun. 5, 2025

(51) Int. Cl.

*H04L 65/00* (2022.01)
*H04W 12/06* (2021.01)

(Continued)

(52) U.S. Cl.

CPC ......... *H04W 12/122* (2021.01); *H04W 12/06* (2013.01); *H04W 12/08* (2013.01)

(58) Field of Classification Search

CPC ..... H04W 4/02; H04W 12/122; H04W 12/06; H04W 12/08; H04W 24/04; H04W 24/10;

(Continued)

(56) References Cited

U.S. PATENT DOCUMENTS 11,657,681 B1 * 5/2023 Rodriguez Bravo ........................ G07F 19/207 235/379
2004/0137887 A1 7/2004 Niemi (Continued)

FOREIGN PATENT DOCUMENTS

DE 10027380 A1 12/2001
DE 102017001092 A1 8/2018

(Continued)

*Primary Examiner* — Phuoc H Doan

(74) *Attorney, Agent, or Firm* — Sand, Sebolt & Wernow Co., LPA

(57) ABSTRACT

A design for secure radio authorization system for a discovery of an attack on the radio authorization system. The radio authorization system is for access restriction systems, for example for securing radio keys, such as automobiles. The design of the secure radio authorization system can also be used in simpler systems and can be combined with the numerous known solutions, such as complex release signals. The focus is not on the direct prevention of an attack, but rather on the determination of whether or not a signal is an original signal of the radio authorization system. The signal and not (only) with reference to the content encoded in the signal, wherein samplings of a signal characteristic are compared over the course of time of an input signal with a target relation in order to determine whether a deviation from the target relation lies within a pre-defined tolerance.

20 Claims, 8 Drawing Sheets

(51) Int. Cl.
*H04W 12/08* (2021.01)
*H04W 12/122* (2021.01)

(58) Field of Classification Search
CPC .... H04W 72/0453; G01S 7/282; G01S 7/417; G06F 21/556; G01R 31/2884; G07F 19/2055; G01N 29/14
See application file for complete search history.

(56) References Cited

U.S. PATENT DOCUMENTS

| | | | | |
|---|---|---|---|---|
| 2018/0004944 | A1* | 1/2018 | Nagata | G01R 31/2884 |
| 2021/0166509 | A1 | 6/2021 | Stitt | |
| 2021/0266747 | A1* | 8/2021 | Hadaschik | H04W 24/10 |

FOREIGN PATENT DOCUMENTS

| | | | |
|---|---|---|---|
| EP | 3564703 | A1 | 11/2019 |
| WO | 2000005696 | A2 | 2/2000 |
| WO | 20000012846 | A1 | 3/2000 |
| WO | 2020229294 | A1 | 11/2020 |

* cited by examiner

DETECTION OF ATTACKS ON RADIO AUTHORIZATION SYSTEMS

TECHNICAL FIELD

The invention relates to a new concept for secure wireless authorization systems with regard to detecting an attack on the wireless authorization system, in particular for access restriction systems, for example for securing radio transmitter keys, for example for motor vehicles.

BACKGROUND ART

Today, wireless authorization systems and/or access restriction systems are used in many different areas. For example, almost every car today is equipped with a contact-free access restriction system that allows the owner of the car to open and lock it using wireless authorization. Furthermore, wireless authorization systems are also widely used in the field of wireless networking technology and related areas. Such wireless authorization and/or access restriction systems are generally used to prevent unauthorized access by third parties. It is not uncommon for such systems to be used to protect not inconsiderable financial assets, such as a car, or, in particular, sensitive data, e.g. in wireless networks, or similar, against unauthorized access by third parties.

Wireless authorization systems, access restriction devices and/or access restriction systems can, for example, be set up to control, monitor and/or grant an approval, for example an access, in particular via an access control means and/or by means of an access control means.

Access includes, in particular, access, activation, deactivation and/or opening. In particular, access, entry, activation, deactivation and/or opening is generally only granted if, after an authorization attempt has been carried out, if necessary after an authorization attempt has been repeated several times, authorization has been successfully carried out and, in particular, there have been no or only a maximum of a predetermined number of incorrect authorization attempts.

As a rule, access, entry, activation, deactivation and/or opening is only approved (granted) if a predefined authentication requirement is satisfied, for example a correct password is entered or, for example, a certificate is valid and/or marked as valid in the access system and/or a key closes in a lock. However, other authentication requirements such as the correct answer to a question or a code can also be used. For example, an access restriction device can send out a code that is processed by an authorization means and the result can be transmitted to the access restriction device and checked there, in particular compared with a predetermined specification, and the approval can be made dependent on the result of the check.

An authentication request can contain a number of authentication sub-requests, such as for multi-factor authentication.

In addition to access to an area in the sense of the possible movement of an object and/or a person into this area, for example the interior of a room or a vehicle, access can also in particular be understood to mean access to a function, in particular also in the sense of activation or enabling of a function, for example access to the function of starting a vehicle or access to the "dispense coffee" function of a coffee machine. Accordingly, access control systems are in particular not only systems that only allow control, restrict, grant and/or prevent access to an area, in the sense of the possible movement of an object and/or a person into this area, but in particular also systems that control, restrict, grant and/or prevent access to a function, in particular also in the sense of activating or enabling a function.

Access control systems can be considered in particular as authorization systems, for example for logging into computer systems, for example by means of a password and/or a certificate, or also classic access control systems such as locks, barriers, doors and/or locks and/or systems for enabling functions, for example of a service station such as a coffee machine. In particular, these can be doors and/or ignition locks and/or starters of a vehicle (e.g. motor vehicle, aircraft, ship or autonomous taxi, as well as all conceivable other forms). It can also protect and/or authorize access to any other service station (ATM, telephone, coffee machine—the list can be extended almost indefinitely). Possible means of authorization include mobile phones, codes, certificates and/or input systems for entering passwords.

The granting of access is often also or only dependent on whether the authorization means or the second object is in the vicinity of the first object, with access being granted in particular only if the distance is less than a predetermined distance. The distance can also be defined by a reception power/strength. Phase-based distance measurement and time-of-flight analyses are also known means of determining distances. All these methods are vulnerable to a "man in the middle" or "relay attack". RTT (round trip time) analysis is the most secure method against this type of attack, which is why it is the preferred method if a high level of security is required. In bandwidth-limited wireless systems, a round trip time analysis is most easily performed by analysing the time of the incoming message symbols or other characteristics in the wireless signal A round trip time analysis is often subject to "early detect/late commit" attacks. The invention can be used in particular to detect this and similar types of attack.

Numerous possible types of attack on wireless-based authorization systems, access restriction devices and/or access restriction systems are known, in particular relay attacks, attacks by third parties on such systems, in particular on systems for access restriction in cars and/or motor vehicles or in the area of access restriction in wireless networks, such as the "range extender" or "man in the middle" attack. This type of attack can be detected by a round trip time (RTT) analysis of the signal. This RTTanalysis can be carried out, for example, by measuring the exact times at which the individual symbols of a message arrive. However, the attacker can try to manipulate this time measurement with an "early detect/late commit" attack, for example, so that the "man in the middle" is not detected. As the inventor has recognised, an (attack) signal from such a third party is generally more compact in terms of time than an original signal, in particular has a steeper rise, especially with regard to the signal amplitude, and/or has a deviation with regard to the (temporal) change in the phase of the signal.

Previous concepts for secure wireless authorization systems were primarily based on preventing an attack as efficiently as possible. To achieve this, the authorization signal required for access is made as complex as possible so that an attack is as difficult as possible. For example, broadband signals/systems or systems with numerous different authorization signals and/or sequences of these signals and/or particularly complex encoded or calculated authorization signals are used here. For example, a method is known from DE 10 027 380 A1 that generates a broadband signal on the basis of a request and checks at the receiver whether the received signal corresponds to the expectation based on the request. A dual tone method or a method with sequences of dual tones is also known from US 2004/0 137 877 A1, WO 2000 005, 696 A2 and WO 2000 012, 846 A1 in which the receiver checks whether the dual tones or their sequence are received with the expected purity. For this purpose, the receiver has the option of receiving the received signal with a large bandwidth or with variable filters in order to analyse it. For example, a 3rd order interference generated by a relay can be recognised by mixing the dual tones. The known systems are correspondingly complex and technically sophisticated. Correspondingly expensive system components, such as a broadband receiver, or a relatively powerful processing unit are generally required here, making these systems, methods and/or components resource-intensive Furthermore, as technology advances, it is usually becomes quite quickly possible in practice to circumvent systems that were initially considered secure because, for example, more computing power is available at a lower price and in a smaller space than was the case when the systems were designed.

A method is also known from DE 10 2017 001 092 A1 for recording spectra of the ambient spectra received at a car and at a key and comparing them in order to determine whether both are in approximately the same place in order to prevent relay attacks.

The object of the invention is therefore to present a concept for secure wireless authorization systems and/or access restriction systems that can also be used in simpler systems and can be combined in particular with the numerous known solutions, for example complex authorization signals, and whose design in particular is not dependent on the assumption of limited computing power.

This object is achieved by a concept in which the focus is not on the direct prevention of an attack, but on determining whether or not a signal is an original signal of the wireless authorization system, this in relation to the signal and its temporal form and/or configuration and not (only) in relation to the content encoded in the signal. Based on this determination, a decision can be made, for example, as to whether the signal is accepted and further checked or rejected, and thus whether access is granted or denied.

The problem here is that a transmitted signal is changed on its way to the receiver. The inventor has recognised that it is therefore problematic to work with absolute values for the assessment of the signal. Better results can be achieved using relative values, as already described in WO 2020/229294 A1. Even more advantageous than relating to preceding sections of a signal, in particular in another slot, symbol or chip, is, as the inventor has now recognised, to use relative values in relation to the signal change being analysed. In particular, an edge of a signal proper can be assessed on the basis of reference variables obtained from this edge.

SUMMARY OF THE INVENTION

The concept according to the invention comprises a method for deciding on the granting of an approval in a wireless authorization system based on at least one change in at least one signal characteristic over the progression in time of a received input signal comprising at least one first and one second object, with said decision on the effecting of the approval being based on at least one change of at least one signal characteristic over the progression in time of an input signal received at the at least one first object, said signal characteristic being and/or including an amplitude and/or phase, said wireless authorization system being designed to transmit a plurality of symbols and/or chips with a first symbol or chip rate encoded in at least one first analogue data signal from the first object to the second object and/or from the second object to the first object, and to effect the approval through an authorization signal from the second object to the first object, said authorization signal having at least one predefined change in the at least one signal characteristic over the progression in time and being determined by the wireless authorization system exclusively on the basis of data predefined in the wireless authorization system and/or on the basis of signals of the wireless authorization system and being part of the at least one first analogue data signal, wherein, when the input signal is received at the first object, samplings of the at least one signal characteristic of the received input signal are taken in such a way that at least a first sampling takes place at a first point in time and a second sampling takes place at a second point in time, in particular at a predefined time gap between the first and second points in time, wherein the at least one first sampling determines at least one first actual value for the at least one signal characteristic and the at least one second sampling determines at least one second actual value for the at least one signal characteristic, wherein the at least one target relation is determined by the wireless authorization system exclusively based on data predefined in the wireless authorization system and/or exclusively based on signals of the wireless authorization system, in particular on the basis of the predefined change in the at least one signal characteristic over the progression in time of the authorization signal, wherein at least one deviation is determined by a comparison of the at least one first and at least one second actual value with the at least one target relation, and a. the received input signal is interpreted as an attack and/or as a signal foreign to the wireless authorization system and/or to deny an approval if the at least one deviation is outside a predefined tolerance and/or b. is interpreted as a signal of the wireless authorization system and/or is recognised by the wireless authorization system as an authorization signal and/or an approval is granted if the at least one deviation is within the predefined tolerance, wherein the second object is designed to transmit the authorization signal in such a way that the at least one deviation of the at least one first and at least one second actual value of the change over the progression in time of the at least one signal characteristic, in particular of an authorization signal received at the first object as an input signal, from the at least one target relation is within the predefined tolerance. The method characterised in that the target relation is determined by a target expected value range, in particular a target expected value; the method characterised in that the target expected value range, in particular the target expected value, is a target value range, in particular a target value, for the second actual value of the at least one signal characteristic expected in the at least one second sampling, and/or a target ratio and/or a target difference and/or a target rate of change between the at least one signal characteristic of the at least one first sampling and the at least one second sampling, in particular in the time gap between the first and second points in time; the method characterised in that the target expected value range, in particular the target expected value, is assigned to the at least one first actual value by the wireless authorization system and/or is determined on the basis of the at least one actual value; the method characterised in that the target value range, in particular the target value, for the second actual value of the at least one signal characteristic expected in the at least one second sampling is calculated from the first actual value by means of the target ratio and/or the target difference and/or the target rate of change, and in particular in that, for the comparison, the calculated target value range, in particular the target value, is compared with the actual value of the second sampling; the method characterised in that an actual relation of the change in time in the at least one signal characteristic of the received input signal over the progression in time is determined from the first and second actual values and the actual relation is compared with the target relation, wherein the actual relation is determined in particular as an actual ratio or actual difference between the at least one signal characteristic of the at least one first sampling and the at least one second sampling or as a rate of change over the progression in time of the at least one parameter of the input signal in the time gap between the first and second points in time; the method characterised in that, for the comparison of the actual relation with the target relation, the actual ratio is compared with the target ratio or the actual difference is compared with the target difference or the rate of change over the progression in time is compared with the target rate of change; the method characterised in that the target relation and/or the predefined tolerance is determined on the basis of calibration data for the at least one predefined change in the at least one signal characteristic over the progression in time, with the calibration data originating from a plurality of measured authorization signals, wherein, in particular, an experience value table and/or an experience value function is generated on the wireless authorization system using the calibration data and stored in the wireless authorization system, and/or wherein, in particular, initial calibration data from the plurality of measured authorization signals are supplemented and/or at least partially replaced by data from authorization signals measured as input signals, in particular under weighting of the data, in particular with regard to their time of origin; the method characterised in that at least one statistical parameter, in particular mean value, median, quartile, quantile, confidence interval, confidence range, variance and/or standard deviation, is determined from the calibration data and in that the statistical parameters, in particular mean value, median, quartile, quantile, variance and/or standard deviation, are used to determine the target relation, the target expected value range, in particular the target expected value, and/or the predefined tolerance; the method characterised in that the predefined tolerance is 80% or less of the change in the signal characteristic in the signal edge and/or characterised in that the first and second points in time have a time gap in the range from 1/16 to 1/4 of the period of the wireless signal and/or in the range from 50 ns to 250 ns; and the method characterised in that a plurality of samplings is carried out on the received input signal with each two of the plurality of samplings being considered as a pair of first and second samplings, the respective pairs each being compared with the target relation, with the pairs in particular being at least partially offset in time from one another in the progression in time of the input signal, in particular being consecutive to one another in time and/or overlapping in time, wherein in particular the first sampling of a second of the pairs corresponds to the second sampling of a first of the pairs and/or wherein, in particular, an approval is denied if the deviation of one of the pairs of the plurality of samplings is outside the predefined tolerance describe advantageous embodiments of the method according to the invention Furthermore, the object is achieved by a wireless authorization system with a first transceiver in and/or on a first object and a second transceiver in and/or on a second object, wherein the wireless authorization system is designed to transmit from the first to the second transceiver a plurality of symbols and/or chips encoded with a first symbol or chip rate in at least one first analogue data signal and to transmit from the second to the first transceiver a plurality of symbols and/or chips encoded with a second or the first symbol or chip rate in at least one second analogue data signal, wherein the wireless authorization system is designed to take samples of actual values of at least one change in at least one signal characteristic over the progression in time of an input signal, in particular a second analogue data signal, received at the first transceiver in a wireless communication between the first and second transceiver, and furthermore is designed for comparison of the actual values of the samplings with at least one target relation for determining at least one deviation, wherein the at least one signal characteristic is and/or includes an amplitude and/or phase wherein the wireless authorization system is designed a. to interpret the input signal as an attack and/or as a signal foreign to the wireless authorization system and/or to deny the approval if the deviation is outside the at least one predefined tolerance and/or b. to interpret the input signal as a signal of the wireless authorization system and/or as an authorization signal and/or to grant an approval if the deviation is within the at least one predefined tolerance; wherein the wireless authorization system is designed to determine the target relation and/or the predefined tolerance exclusively based on data and/or exclusively based on signals of the wireless authorization system predefined in the wireless authorization system, in particular on the basis of a predefined change in the at least one signal characteristic over the progression in time of an authorization signal, wherein the second transceiver is designed to transmit the authorization signal such that the deviation of at least one first and at least one second actual value from the at least one target relation is within the predefined tolerance, wherein the second transceiver and/or the second object is designed to determine the authorization signal exclusively based on data predefined in the wireless authorization system and/or exclusively based on signals of the wireless authorization system, in particular of the at least one first analogue signal, wherein the second transceiver and/or the second object is designed to transmit the at least one authorization signal as part of the at least one second analogue data signal and its advantageous embodiments having an access restriction device, said access restriction device being designed to grant or deny access, in particular by means of an access restriction means, said access restriction device being designed to deny access if the deviation of the actual values of the input signal is outside the at least one predefined tolerance, and/or to grant access if the deviation of the actual values of the input signal from the target relation is within the at least one predefined tolerance and in which the second transceiver is designed to transmit the authorization signal to the first transceiver such that if the deviation in the actual values of the input signal from the target relation lies within the at least one predefined tolerance as well as by an access restriction system comprising a wireless authorization system with a first transceiver in and/or on a first object and a second transceiver in and/or on a second object, wherein the wireless authorization system is designed to transmit from the first to the second transceiver a plurality of symbols and/or chips encoded with a first symbol or chip rate in at least one first analogue data signal and to transmit from the second to the first transceiver a plurality of symbols and/or chips encoded with a second or the first symbol or chip rate in at least one second analogue data signal, wherein the wireless authorization system is designed to take samples of actual values of at least one change in at least one signal characteristic over the progression in time of an input signal, in particular a second analogue data signal, received at the first transceiver in a wireless communication between the first and second transceiver, and furthermore is designed for comparison of the actual values of the samplings with at least one target relation for determining at least one deviation, wherein the at least one signal characteristic is and/or includes an amplitude and/or phase wherein the wireless authorization system is designed a. to interpret the input signal as an attack and/or as a signal foreign to the wireless authorization system and/or to deny the approval if the deviation is outside the at least one predefined tolerance and/or b. to interpret the input signal as a signal of the wireless authorization system and/or as an authorization signal and/or to grant an approval if the deviation is within the at least one predefined tolerance; wherein the wireless authorization system is designed to determine the target relation and/or the predefined tolerance exclusively based on data and/or exclusively based on signals of the wireless authorization system predefined in the wireless authorization system, in particular on the basis of a predefined change in the at least one signal characteristic over the progression in time of an authorization signal, wherein the second transceiver is designed to transmit the authorization signal such that the deviation of at least one first and at least one second actual value from the at least one target relation is within the predefined tolerance, wherein the second transceiver and/or the second object is designed to determine the authorization signal exclusively based on data predefined in the wireless authorization system and/or exclusively based on signals of the wireless authorization system, in particular of the at least one first analogue signal, wherein the second transceiver and/or the second object is designed to transmit the at least one authorization signal as part of the at least one second analogue data signal; with the access restriction device being designed a. to deny access if the deviation in the actual values of the input signal from the target relation lies outside the at least one predefined tolerance, and/or b. to grant access if the deviation in the actual values of the input signal from the target relation lies within the at least one predefined tolerance.

In achieving the object of the invention, a wireless authorization system comprising at least one first and one second object, is set up to bring about an approval, in particular to approval and/or grant access, by means of an authorization signal from the second object to the first object. Here a plurality of symbols and/or chips with a first symbol or chip rate encoded in at least one first analogue data signal are transmitted from the first object to the second object by means of the wireless authorization system. The first and second objects are each formed by a transmitter and/or receiver, in particular a transceiver, for example by a transmitter or transceiver in a (radio transmitter) key of a car and a receiver or transceiver of a wireless locking unit of the car in a wireless access system or wireless authorization system. In this context, granting an approval is understood as meaning, for example, opening, unlocking and/or starting and/or allowing the corresponding car to be opened or started after sending the authorization signal to the car by actuating the (radio transmitter) key and receiving the authorization signal at the car's wireless locking unit. Other examples of authorizations can be, for example, granting access to a wireless network or granting access to a function, such as the "dispense coffee" function of a coffee machine. In principle, any granting of access to an object; location, area or space; and/or function that requires authentication for access in order to prevent unauthorized access can be considered an approval.

However, the authorization signal can also represent only part of the necessary enabling measures; a further component of the authentication may be necessary, for example, in order to open the car door, although this is preferably not the case. For example, a further signal or signal sequence may also be necessary for this, in particular at different frequencies or in different frequency bands, although this is also preferably not the case. It may also be necessary, for example, to implement the method according to the invention several times, i.e. with several consecutive and possibly different authorization signals in order, for example, to ultimately open a lock. According to the invention, the authorization signal used in a method according to the invention is in particular not a multi-tone signal.

An authorization signal can also be part of a signal loop, i.e. one or more signals transmitted back and forth between the first and the second object. For example, the first object can send a first message containing a first signal to the second object and the second object can respond with a second signal, in particular an authorization signal, to the first object. The second signal, in particular the second message transmitted in it, is here in particular dependent on the first message of the first signal. The first and/or second message can, for example, be encrypted and/or can contain a (symbol) code. The second object can therefore decrypt the (possibly encrypted) (symbol) code of the first message and, using the first (symbol) code, generate a second (symbol) code and transmit this (possibly encrypted) in the second signal. The transmission of the first signal is preferably triggered by an initialisation signal from the second object to the first object. In this case, both the first and the second objects should be designed in such a way that both objects can each serve as transmitter and receiver.

Authorization signals can furthermore be coded and/or encrypted, for example. In particular, a corresponding encoding and/or encryption of an input signal in the wireless authorization system is furthermore examined to determine whether it corresponds to the encoding and/or encryption of an authorization signal and/or whether the content or (symbol) code to be found within the encoding and/or encryption of an authorization signal is also to be found in the input signal.

Furthermore, authorization signals can contain not only a corresponding encoding and/or encryption and/or a corresponding content and/or (symbol) code, but also additionally have at least one predetermined change in at least one signal characteristic over the progression in time of the signal, which fulfils certain requirements (the corresponding requirements are explained in more detail later in the description).

In particular, the at least one authorization signal is determined exclusively on the basis of data predefined in the wireless authorization system and/or on the basis of signals of the wireless authorization system sent by the wireless authorization system, in particular based on the at least one predetermined change in the at least one signal characteristic over the progression in time of the authorization signal(s). A change in the signal characteristic(s) over time is to be understood here in particular as a development of the signal characteristic(s) over the progression in time for an individual signal, in particular a single edge of the signal.

The change in the signal characteristic(s) over the progression in time can therefore in particular be or represent a change in amplitude and/or phase over the progression in time. For example, a signal, in particular a single signal edge, can have an approximately linear increase in its amplitude over the progression in time during transmission and reception, which can be determined in the same way during reception. The dependency between the increase in amplitude and time can also deviate from a linear relationship. In particular, dependencies analogous to a Gaussian function can arise, in which the increase or decrease in amplitude—the increase is preferably considered—is not constant over the progression in time and itself undergoes a change over the progression in time via the signal or the signal edge. Authorization signals therefore have a predetermined but not necessarily constant rate of change, i.e. in particular a defined gradient, depending on the signal characteristic(s) over time, which are constant in particular in the case of a linear signal structure over the progression in time or, in the case of deviating functional forms—e.g. Gaussian curves—are themselves dependent on time, insofar as they are not constant over the progression in time. If an authorization signal is therefore determined by the wireless authorization system on the basis of predefined data, such an authorization signal has a predefined temporal form with regard to the at least one signal characteristic, in particular with regard to amplitude and/or phase or their temporal increase and/or decrease and/or development over the time in which a corresponding signal is or can be transmitted, which in particular depends on the predefined data.

The authorization signal(s) is/are furthermore part of the at least one first analogue data signal and information is encoded in the authorization signal(s), in particular digitally, in a plurality of symbols and/or chips. Thus, the authorization signal(s) can be generated according to an instruction stored on the key and/or based on a signal generated by the wireless authorization system and received by the key. In particular, no external information is used to generate the authorization signal(s) which is not based on predefined data stored in the wireless authorization system or generated on the basis of such data by the method and/or the wireless authorization system. In particular, the authorization signal(s) is/are not based on signals foreign to the wireless authorization system and/or on environmental signals.

It is particularly advantageous to be able to use the concept with standardised data transmission signals as authorization signals, in particular known systems such as 4G, 5G, Bluetooth and/or WiFi, whereby in particular preferably no dual tones and/or continuous waves and/or no signals specifically intended for this method are used. Instead, the standardised data transmission signals should be used to detect a possible attack.

In particular, the authorization signals used are those that are also used, in particular simultaneously, for the digital transmission of data, in particular user data, in particular in the form of chips and/or symbols. In particular, the signals of such a transmission system are used for the invention, preferably in particular the signals of a Bluetooth system. In particular, the objects are transceivers of a digital data transmission system, in particular preferably operating with QAM. In particular, the authorization signals are signals which are used, in particular simultaneously, for digital data transmission, in particular by means of the transmission of chips and/or symbols, in particular signals of a digital, in particular QAM, ASK, FSK, GFSK, PSK, QPSK, QAM, APSK and/or OFDM based, data transmission system, in particular a chip-synchronised and/or symbol-synchronised digital data transmission system.

The use of an authorization signal containing encoded digital signals has the further advantage that the edges contained in the authorization signal by the information encoded therein can be used together with a further signal, in particular carrying encoded digital information, in order to measure the signal progression in time between the first and second object very precisely. This creates greater security for the method and system according to the invention. In particular, the method and/or the system is designed for and/or includes this type of measurement. A specific signal progression in time can therefore also be included in an approval decision.

In particular, the authorization signal is a single-channel signal and in particular not a dual-tone signal and/or a signal with only orthogonal carrier frequencies at any time and/or with only one carrier frequency at any time in a frequency band having such a spectral width and/or whose spectral width is selected in such a way that no third-order tones are generated during the amplification of the authorization signal, and/or with only one carrier frequency at any time in a frequency band of at least 0.5 MHz, in particular at least 1 MHz, in particular symmetrically around each tone of the authorization signal, whereby the authorization signal preferably has only one carrier frequency and/or exclusively orthogonal carrier frequencies at any time.

Thus, advantageously, only one tone or frequency exists at any time in the authorization signal in each frequency band, in particular all having the same spectral width selected from the previously specified frequency bandwidths, with the frequency bands being arranged symmetrically around each tone or each frequency of the authorization signal, and/or advantageously only orthogonal tones or frequencies exist in the authorization signal at any time in each frequency band, in particular all having one of the previously specified widths, with the frequency bands being arranged in particular symmetrically around each tone or frequency of the authorization signal.

In particular, no two-tone measurement is performed. Instead, the method is based on the fact that an attacker, for example in the case of an "early detect/late commit" attack, must perform a temporal compression of the signal and thus a temporally faster change of the at least one signal characteristic, in particular in the form of a faster amplitude increase and/or a faster phase change of the signal, which is recognised by the method. The authorization signal, in particular within individual frequency bands, in particular within a single signal, in particular within a single edge of a single signal, can be selected in particular as described above. This simplifies the equipment and saves energy.

Not every input signal received at the first object must be an authorization signal; it may, for example, also be an attack signal from a third party. Consequently, the origin of the input signal received at the first object may be the second object, in particular if the input signal is an authorization signal, or may differ from it, for example due to an attack on the wireless authorization system by a third object not belonging to the wireless authorization system. An attack can therefore be understood to mean, for example, an attempt by such a third object to influence the wireless authorization concept or the communication between the first and second object within such a wireless authorization system, for example to gain unauthorized access, for example to a wireless network or car.

Such an attack must be recognised according to the invention. For this, in a method for deciding on the effecting of an approval in a wireless authorization system comprising at least one first and one second object, with said decision on the effecting of the approval being based on at least one change of at least one signal characteristic over the progression in time of an input signal received at the at least one first object, said signal characteristic being and/or including an amplitude and/or phase, said wireless authorization system being designed to transmit a plurality of symbols and/or chips with a first symbol or chip rate encoded in at least one first analogue data signal from the first object to the second object and/or from the second object to the first object, and to effect the approval through an authorization signal from the second object to the first object, said authorization signal having at least one predefined change in the at least one signal characteristic over the progression in time and being determined by the wireless authorization system exclusively on the basis of data predefined in the wireless authorization system and/or on the basis of signals of the wireless authorization system and being part of the at least one first analogue data signal, wherein, when the input signal is received at the first object, samplings of the at least one signal characteristic of the received input signal are taken in such a way that at least a first sampling takes place at a first point in time and a second sampling takes place at a second point in time, in particular at a predefined time gap between the first and second points in time, wherein the at least one first sampling determines at least one first actual value for the at least one signal characteristic and the at least one second sampling determines at least one second actual value for the at least one signal characteristic, wherein the at least one target relation is determined by the wireless authorization system exclusively based on data predefined in the wireless authorization system and/or exclusively based on signals of the wireless authorization system, in particular on the basis of the predefined change in the at least one signal characteristic over the progression in time of the authorization signal, wherein at least one deviation is determined by a comparison of the at least one first and at least one second actual value with the at least one target relation, and a. the received input signal is interpreted as an attack and/or as a signal foreign to the wireless authorization system and/or to deny an approval if the at least one deviation is outside a predefined tolerance and/or b. is interpreted as a signal of the wireless authorization system and/or is recognised by the wireless authorization system as an authorization signal and/or an approval is granted if the at least one deviation is within the predefined tolerance, wherein the second object is designed to transmit the authorization signal in such a way that the at least one deviation of the at least one first and at least one second actual value of the change over the progression in time of the at least one signal characteristic, in particular of an authorization signal received at the first object as an input signal, from the at least one target relation is within the predefined tolerance of the invention, at least one change in at least one signal characteristic during the progression in time of the input signal received at the first object is used to determine whether the input signal is a signal, in particular an authorization signal, of the wireless authorization system or is detected as an authorization signal by the wireless authorization system and/or whether the input signal is a signal foreign to the wireless authorization system, in particular a signal from a third object not belonging to the wireless authorization system, and/or whether the input signal represents an attack, in particular by a third object not belonging to the wireless authorization system. The signal characteristic considered is an amplitude and/or a phase of the signal and/or contains one or more of these. A received input signal is therefore monitored or analysed by the wireless authorization system with regard to its amplitude and/or phase over the progression in time, thus with respect to the change in amplitude and/or phase during the progression in time. In particular, the speed at which the amplitude of the signal increases or decreases or the phase of the signal changes is analysed here. For this it is not necessary in particular to determine the temporal width of the signals over the complete signal or a signal edge or the spectral width of the signal. Consequently, it is not necessary in particular to determine the time taken or duration from the start of transmission until the maximum amplitude or a threshold value is reached, or the decrease from the maximum amplitude to the complete drop or drop below a threshold value of the amplitude.

Signals that are not/do not represent signals of the wireless authorization system, in particular are not authorization signals, in particular signals that originate, for example, from an "early detect/late commit" attack by an object foreign to the wireless authorization system, generally have a significantly faster increase in signal amplitude or a significantly faster phase change, thus deviating from a temporal target shape of the signals of the wireless authorization system, in particular of authorization signals, especially in the region of the signal change.

The object of the inventive method is to detect such deviations. The at least one signal characteristic of the input signal over the progression in time is therefore used to determine, on the basis of the deviation detected, whether the input signal originates from a second object, i.e. from a part of the wireless authorization system, and therefore the approval is being carried out in particular by an authorized user, or originates from a third object and thus an unauthorized user/unauthorized object is attempting to gain access. The object is to detect such an attack by a non-authorized object and/or non-authorized user in order to prevent access from being granted.

In order to do this when the input signal is received, the at least one signal characteristic, in particular the current amplitude and/or phase, of the received input signal is sampled in such a way that at least one first sampling takes place at a first point in time and one second sampling takes place at a second point in time. In particular, sampling takes place at a predefined time gap between the first and second points in time. The first and second samples are also taken from a single signal, and also from the same or a single signal edge. In particular, the predefined time gap between the first and second sampling is selected such that a time gap between the start of the reception of an authorization signal and the reaching of a maximum amplitude of the signal is less than 50%, in particular less than 25%, in particular less than 10% of the time gap. In particular, the predefined time gap is in the range of 1/16 to 1/4 of the period of the wireless signal and/or, in particular with typical wireless transmission protocols such as Bluetooth, in the range from 50 ns to 250 ns.

In particular, the first and second points in time or their time gap are advantageously selected such that the first and second sampling take place in a region of the analysed signal edge of an authorization signal and at a time gap in which a change in the at least one signal characteristic of at least 10 percent, preferably at least 50 percent, in particular in relation to the larger value, is to be expected between the first and second sampling for an authorization signal. For this, the first and second sampling can advantageously take place at points in time that lie in the middle of the signal edge of an expected authorization signal, since the change in the signal characteristic is generally largest in the middle of a signal edge. The middle of a signal edge according to the invention is preferably understood to be in particular the region of the signal edge in which the at least one signal characteristic, in particular amplitude, phase and/or frequency, is in the range of 15 and 85 percent, in particular 25 and 75 percent, of the span covered and/or to be covered by the signal edge, for example the frequency, phase and/or amplitude swing of the signal edge. For example, if the edge covers the range from 2100 to 2200 MHz, the average range would be from 2115 to 2185 MHz, in particular from 2125 to 2175 MHz. The at least one first sampling determines at least one first actual value for the at least one signal characteristic and the at least one second sampling determines at least one second actual value for the at least one signal characteristic. The actual values determined are therefore the measured values for the at least one signal characteristic at the point in time of the first and second sampling, or the current level of the signal amplitude of the signal at that moment in time and/or a corresponding phase of the signal at those points in time. The determined actual values are subsequently compared with at least one target relation, whereby the at least one target relation is determined, in particular by the wireless authorization system, based exclusively on data predefined in the wireless authorization system and/or based on signals of the wireless authorization system, in particular on the basis of the predefined change in the at least one signal characteristic over the progression in time of the authorization signal. The target relation therefore describes how the determined actual values must or should be in relation to one another for the signal to be an authorization signal and/or a signal of the wireless authorization system or so that it can be such a signal or signals. In particular, it can be defined in absolute and/or relative values. For example, the target relation can specify the value by which the actual values must differ or the ratio by which, for example, an amplitude must increase or decrease between the first and second sampling, or which ratios can be expected for an authorization signal.

In an advantageous embodiment of the inventive method, the target relation can be determined by a target expected value range, in particular a target expected value. Advantageously, the target expected value range can be a target value range or the target expected value can be a target value for the second actual value of the at least one signal characteristic expected in the at least one second sampling, and/or a target ratio and/or a target difference and/or a target rate of change between the at least one signal characteristic of the at least one first sampling and the at least one second sampling, in particular in the time gap between the first and second points in time. The target relation can be defined as a target expected value range such that for each potential actual value, an expected actual value range for the second sampling can be predicted or derived from the first actual value. It is also conceivable that not a corresponding absolute value range for the second actual value per se, but the change, in particular increase and/or decrease in the signal amplitude or change in the phase of the signal, between the first and second sampling, consequently the first and second actual value, is considered in the form of relative values, such as gradient, difference and ratio ranges. Together with the first actual value, this can then be used to determine an absolute target expected value range In particular, the target expected value range or the target expected value can advantageously be assigned to the at least one first actual value by the wireless authorization system and/or can be determined on the basis of the at least one actual value. In this case the wireless authorization system determines the target expected value range, in particular the target expected value, on the basis of the first actual value. The wireless authorization system can therefore make a prediction for the actual value of the second sampling or for the difference, ratio and/or rate of change between the actual values of the first and second sampling based on the actual value of the first sampling and subsequently determine by comparison whether or not the measured actual values or the measured actual value of the second sampling is consistent with the prediction made. In particular, the target value range or the target value for the second actual value of the at least one signal characteristic expected in the at least one second sampling can be calculated with particular advantage from the first actual value by means of the target ratio and/or the target difference and/or the target rate of change, with the calculated target value range, in particular the target value, being compared with the actual value of the second sampling for the purpose of comparison. In a method according to the invention, a prediction for an expected second actual value for the at least one signal characteristic at a second point in time according to the invention in a second sampling and/or the absolute or relative change or rate of change over the progression in time of the at least one signal characteristic can therefore be made on the basis of the first actual value, which was determined at a first point in time according to the invention in a first sampling. Of the rate of change over the progression in time of the at least one signal characteristic between the first sampling at the first point in time and the second sampling at the second point in time, in particular taking into account the length of the time gap, in particular of the predefined time gap, between the first and second points in time.

Alternatively or based on this, in a further advantageous embodiment of the method according to the invention, an actual relation of the change in the at least one signal characteristic of the received input signal over the progression in time can be determined from the first and second actual values for the purpose of a comparison of actual values and the target relation, which is then compared with the target relation. The actual relation can thereby be determined in particular as an actual ratio or actual difference between the at least one signal characteristic of the at least one first sampling and the at least one second sampling or as a rate of change over the progression in time of the at least one parameter of the input signal in the time gap between the first and second points in time. In particular, it is advantageous to compare the actual ratio with the target ratio or to compare the actual difference with the target difference or to compare the rate of change over the progression in time with the target rate of change in order to compare the actual relation with the target relation.

In particular, the target relation, in particular the target expected value range or target expected value, in particular the target value range or target value and/or target ratio, target difference and/or target rate of change can be dependent on the frequency of the signal considered or dependent on the ambient temperature and/or weather conditions. It is therefore conceivable to define adapted target relations, in particular target expected value ranges or target change rates or target expected values, in particular target value ranges or target values and/or target ratios, target differences and/or target rates of change for signals at different frequencies or for different (ambient) conditions.

In particular, actual relation, in particular actual difference, actual ratio and/or actual rate of change and/or target relation, in particular target difference, target ratio and/or target rate of change, can be considered as standardised. Standardisation can be used in particular to compensate fluctuations in the signal characteristics due to environmental influences and/or distance, for example a low total energy of the signal or a reduced maximum signal amplitude at the receiver. In particular, it can be advantageous to consider an actual or target difference in such a way that the difference between the first and second sampling is divided or standardised by the actual value of one of the two samplings, whereby the actual value of the first sampling is preferred. Alternatively, standardisation to the total radiated energy of a signal can be advantageous. In particular, it can be advantageous also in the case of rate of change as the absolute values to consider these as standardised and in particular to use the actual value of one of the samplings, preferably the first sampling, or the irradiated energy for standardisation.

By a comparison of the actual values or the actual relation with the target relation, at least one deviation is determined, by means of which the wireless authorization system detects whether the received signal is to be interpreted as a signal of the wireless authorization system and/or is to be recognised as an authorization signal and/or enabling is effected, or whether it is to be interpreted as an attack and/or a signal foreign to the wireless authorization system and/or enabling is denied. The at least one deviation determined by a comparison of the actual values or the actual relation with the at least one target relation is compared with a predefined tolerance.

The at least one predefined tolerance thus defines the extent to which the actual values or one of the actual values or the actual relation may deviate from the target relation. The predefined tolerance therefore establishes in particular a criterion for distinguishing between an authorization signal and/or a signal foreign to the wireless authorization system and/or an attack on the basis of the deviation from the comparison between actual values or the actual relation and the target relation with regard to the at least one signal characteristic of received input signals, and defines the deviation up to which an authorization signal can be recognised.

If the corresponding comparison shows that the at least one deviation of the actual values of the first and second sampling and/or the actual value of the second sampling and/or the actual relation, in particular the ratio, the difference and/or the rate of change between the actual values of the first and second sampling, from the target relation with regard to the at least one signal characteristic of the received input signal is outside the at least one predefined tolerance, the input signal is interpreted as an attack and/or as a signal foreign to the wireless authorization system and, in particular, an approval is denied.

If the at least one deviation of the actual values of the first and second sampling and/or of the actual value of the second sampling and/or of the actual relation, in particular the ratio, the difference and/or the rate of change between the actual values of the first and second sampling from the target relation with regard to the at least one signal characteristic of the received input signal within the at least one predefined tolerance and, in particular, the coding and/or encryption and/or the corresponding content and/or (symbol) code of the input signal corresponds to that of an authorization signal, the input signal is interpreted as a signal, in particular an authorization signal, of the wireless authorization system. In particular an approval is then granted. In particular, the content of the signal is only checked if the at least one deviation of the actual values from the target relation with regard to the at least one signal characteristic of the received input signal is within the at least one predefined tolerance. The tolerance can also be defaulted with the value zero. In particular, there is a correlation between a range possibly given by the target relation and the tolerance. As long as only a single comparison is carried out independently of other comparisons, it is generally irrelevant as to how an overall difference to be accepted is split between the range and the tolerance. If several pairs of actual values are considered together, there is certainly a difference in that a range is assigned to each individual pair and a tolerance can be assigned to the entirety of the values.

In particular it should be noted that signals of the wireless authorization system, in particular authorization signals, can also be subject to fluctuations over the progression in time, also with regard to at least one signal characteristic, so that the predefined tolerance in particular must be selected in such a way that the corresponding fluctuation of the signals of the wireless authorization system over the progression in time of the signal, in particular authorization signal, is within the tolerance. Such fluctuations can occur in particular, for example, due to the influence of the ambient temperature or ambient weather conditions on wireless signals or from a dependency on the frequency of the wireless signals, but also in particular with regard to the quality of the components used, such as transmitters and/or receivers.

In particular, the second object is designed to transmit authorization signals in such a way that the at least one deviation of the at least one first and at least one second actual value of the change over the progression in time or the actual relation of the at least one signal characteristic, in particular of an authorization signal received at the first object as an input signal, from the at least one target relation is within the predefined tolerance. The second object and/or the wireless authorization system is therefore designed in particular to effect an approval by sending the authorization signal to the first object.

In particular, especially in the event that the at least one target relation is defined by a target expected value range and/or is determined as such, the target relation, in particular the target expected value range and the predefined tolerance can jointly define a confidence interval for the actual values, in particular the second actual value, or the actual relation of the at least one signal characteristic of a received input signal, in which such a signal can be recognised and/or interpreted, in particular as an authorization signal and/or as a signal of the wireless authorization system. The confidence interval can in particular comprise the target relation, in particular the target expected value range, in particular be formed by the target expected value range surrounded by the predefined tolerance.

In an advantageous embodiment, the at least one target relation and/or the predefined tolerance can be determined by the wireless authorization system exclusively on the basis of data and/or signals of the wireless authorization system predefined in the wireless authorization system, in particular on the basis of the predefined change in the at least one signal characteristic over the progression in time of the authorization signal.

The at least one target relation and/or the predefined tolerance can thereby differ for different wireless authorization systems or, in particular, they can be adapted to different wireless authorization systems and can therefore be inherent to each wireless authorization system. However, they can also be predefined and/or determined according to the situation and/or based on data, in particular historical data, stored in the wireless authorization system in such a way that they determine how the target relation and/or the predefined tolerance can be derived from the stored data. Alternatively, they can be predefined values, in particular as an absolute or preferably relative numerical value or predefined by limits as absolute or preferably relative numerical values. In particular, the progression in time of the at least one signal characteristic of the authorization signal and the target relation and/or the predefined tolerance are mutually dependent and/or are adapted to one another or define one another for different wireless authorization systems. As a rule, predefined tolerance and/or target relation are applied to the authorization signal.

Advantageously, the target relation and/or the predefined tolerance can be determined on the basis of calibration data for the at least one predefined change in the at least one signal characteristic over the progression in time, with the calibration data originating from a plurality of authorization signals measured, in particular, as input signals. For example, it is conceivable that, in order to calibrate a method according to the invention in a secure environment, i.e. in an environment in which an attack on the wireless authorization system is or can be ruled out, the plurality of authorization signals is sent and received within the wireless authorization system to generate the calibration data. Advantageously, such a calibration is carried out in particular to calibrate an inventive wireless authorization system, in particular, for example, before delivery of an inventive wireless authorization system to an end user.

In particular, an experience value table and/or an experience value function can be generated on the wireless authorization system using the calibration data and stored in the wireless authorization system. The experience value table can be designed such that in the table, a respective target relation or respective target relations, in particular a target expected value range and/or a target expected value and/or a target ratio and/or a target difference and/or a target rate of change, are assigned to and/or can be determined for measured values for the first actual value of the at least one signal characteristic of the first sampling. Respective target relations, in particular a target expected value range and/or a target expected value with regard to an expected measured value for a second actual value of the at least one signal characteristic of the second sampling, in particular in view of the time gap between the first and second point in time or sampling. In particular, the expected second actual value can then be determined and/or read from the experience value table in absolute terms or relative to the first actual value. An expected value function makes it possible in particular to calculate the target relation, in particular the target expected value range or the target expected value for the second actual value of the second sampling, from the measured first actual value of the first sampling, in particular as a function of the time gap between the first and second sampling, i.e. the time gap between the first and second points in time.

Advantageously, the initial calibration data from the plurality of measured authorization signals or the experience values determined from the calibration data and stored in the experience value table and/or the experience value function, in particular originating from the calibration of the method and/or the wireless authorization system already described, can be supplemented and/or at least partially replaced by data from authorization signals measured as input signals, in particular with weighting of the data, in particular with regard to their time of origin. In this way, the calibration is adapted, in particular also with regard to possible ageing of the components used, such as the transmitter and/or receiver or the first and/or second object, in particular with regard to reduced signal intensity and/or reduced measurement accuracy, etc. Resulting from ageing, as well as with regard to the quality of the components used. In particular, the calibration can also be adapted to changing ambient conditions with regard to temperature, for example with regard to deviating ambient temperatures for different seasons and/or different operating locations. It is also possible to use different calibration data for different (ambient) temperatures. Similarly, separate calibration data can alternatively or additionally be provided for signals at different frequencies.

Advantageously, at least one statistical parameter can be determined from the calibration data, in particular the initial and/or updated calibration data. The determined statistical parameter can then be used to determine the target relation, in particular the target expected value range or the target expected value, and/or the predefined tolerance. In particular, the mean value, median, quartile, quantile, confidence interval, confidence range, variance and/or standard deviation can be used as statistical parameters. For example, a target expected value can first be determined from a point cloud of calibration data, in particular a plurality of points originating from a plurality of measurements of a signal edge of a single signal type, in particular for an authorization signal, preferably using averaging.

It can be particularly advantageous if the plurality of measurements of the signal edge for the individual signal type, in particular for each of the plurality of measurements, include measurement points that are taken within the signal edge at an identical relative point in time in the progression in time of the respective signal edge. Following the determination of the target relation, the predefined tolerance for the deviation can be determined using variance and/or standard deviation, for example, in particular for the deviation of the actual value of the second sampling from the target expected value. Similarly, it is possible to proceed in a similar way to the above example in such a way that the target relation deviates from a target ratio, a target difference or a target rate of change or a target expected value range, in particular also in the event that an actual relation between the first and second sampling is considered instead of the actual value of the second sampling. Overall, the use of numerous statistical parameters or their combination to determine the target relation and/or the predefined tolerance from the calibration data is conceivable. Alternatively, the experience value function can be obtained by means of a fit along the expected progression in time of the expected values for an authorization signal, in particular using the calibration described. The predefined tolerance can be added to this to obtain the confidence interval for an authorization signal, for example determined using one of the statistical methods described.

Advantageously, the predefined tolerance can be defined as a value relative to the target expected value and, in particular, the tolerance of the measured value can be 25% or less, in particular 10% or less, in particular 2.5% or less of the maximum signal characteristic change in the signal edge. So for a rising edge in the amplitude from 0 to 80, the tolerance could be 20, in particular 8, particularly preferably 2. The same tolerance would be expedient for the falling edge, but a slightly different tolerance may also be expedient. However, definitions using absolute values are also conceivable.

In a further advantageous embodiment of an inventive method, a plurality of samplings can be performed on the received input signal. The plurality of samplings can be taken either at equidistant time gaps or with varying time gaps. From the plurality of samplings, two of the samplings can then each be considered as a pair of first and second samplings. The respective pairs or the first and second sampling of each pair are then compared with the target relation. In particular, the pairs can be at least partially offset in time from one another in the progression in time of the input signal and can advantageously be in particular consecutive to one another in time and/or overlap in time.

In a further advantageous embodiment, the pairs can be selected and/or formed in such a way that the first sampling of a second of the pairs corresponds to the second sampling of a first of the pairs. Alternatively, however, the first sampling in particular can also form a pair with each of the subsequent samplings on one edge of a signal, whereby within these pairs the time gap between the first and second sampling per pair varies between the pairs. This can also be the case in particular if the plurality of samplings were taken at equidistant time gaps. By means of the two types of pairing of the samplings outlined above, two pairs can thus be obtained from three samplings, for example, and three pairs from four samplings, etc., for comparison according to the inventive method.

In particular, the pairs can advantageously be selected and/or formed in such a way that at least one of the pairs or its first and second sampling are taken in an inventive middle region of a signal edge.

The deviation obtained from the individual comparisons can subsequently be compared both individually and together with the predefined tolerance. Thus, if the pairs are considered separately, an approval can be denied if the deviation of one of the pairs of the plurality of samplings is outside the predefined tolerance. Alternatively, however, the pairs can also be considered together in such a way that, for example, an average deviation across the pairs is determined and an approval is denied if the average deviation is outside the predefined tolerance. The use of other statistical evaluation methods for joint evaluation of the pairs, together with or as an alternative to averaging, is also conceivable and possible.

An inventive method with a plurality of, in particular equidistant, samplings on a single edge of a signal is particularly advantageous or may be necessary if the at least one signal characteristic has a form of change over the progression in time that deviates from a linear change, for example if it has a Gaussian profile. Other forms of change in the at least one signal characteristic over the progression in time are conceivable and can also be evaluated by means of a corresponding, in particular selected and/or adapted, inventive method. In particular, if the change of the at least one signal characteristic over the progression in time does not show a linear progression, the rate of change of the at least one signal characteristic within a single edge of a single signal is not constant over the progression of this signal over the progression in time, but is itself subject to a change. In such a case, the change in the rate of change over the progression in time can then also be used as the respective actual relation and/or target relation.

It can be seen that the method for deciding on the effecting of an approval in a wireless authorization system comprising at least one first and one second object, with said decision on the effecting of the approval being based on at least one change of at least one signal characteristic over the progression in time of an input signal received at the at least one first object, said signal characteristic being and/or including an amplitude and/or phase, said wireless authorization system being designed to transmit a plurality of symbols and/or chips with a first symbol or chip rate encoded in at least one first analogue data signal from the first object to the second object and/or from the second object to the first object, and to effect the approval through an authorization signal from the second object to the first object, said authorization signal having at least one predefined change in the at least one signal characteristic over the progression in time and being determined by the wireless authorization system exclusively on the basis of data predefined in the wireless authorization system and/or on the basis of signals of the wireless authorization system and being part of the at least one first analogue data signal, wherein, when the input signal is received at the first object, samplings of the at least one signal characteristic of the received input signal are taken in such a way that at least a first sampling takes place at a first point in time and a second sampling takes place at a second point in time, in particular at a predefined time gap between the first and second points in time, wherein the at least one first sampling determines at least one first actual value for the at least one signal characteristic and the at least one second sampling determines at least one second actual value for the at least one signal characteristic, wherein the at least one target relation is determined by the wireless authorization system exclusively based on data predefined in the wireless authorization system and/or exclusively based on signals of the wireless authorization system, in particular on the basis of the predefined change in the at least one signal characteristic over the progression in time of the authorization signal, wherein at least one deviation is determined by a comparison of the at least one first and at least one second actual value with the at least one target relation, and a. the received input signal is interpreted as an attack and/or as a signal foreign to the wireless authorization system and/or to deny an approval if the at least one deviation is outside a predefined tolerance and/or b. is interpreted as a signal of the wireless authorization system and/or is recognised by the wireless authorization system as an authorization signal and/or an approval is granted if the at least one deviation is within the predefined tolerance, wherein the second object is designed to transmit the authorization signal in such a way that the at least one deviation of the at least one first and at least one second actual value of the change over the progression in time of the at least one signal characteristic, in particular of an authorization signal received at the first object as an input signal, from the at least one target relation is within the predefined tolerance and the advantageous embodiments of the invention can use the at least one signal characteristic or its change over the progression in time of the input signal in a wireless authorization system to determine the origin of the input signal such that a distinction can be made between a second object whose signal as an authorization signal entitles a user to authorized access, and a third object, in particular an object foreign to the wireless authorization system, whose access is to be prevented and which, for example, carries out an "early detect/late commit" attack. By contrast with the state of the art, which is usually focused exclusively on making an attack as difficult as possible, corresponding authorization signals can be designed to be quite simple and therefore less complex here, as the attack does not have to be prevented immediately, but merely detected in order to thwart it. In particular, "early detect/late commit" attacks can be detected extremely efficiently in this way due to deviating, in particular faster or time-compressed changes in the signal characteristics, for example faster increases or decreases of the amplitude and/or faster phase changes of the (attack) signals. Furthermore, the technical requirements for the design of corresponding wireless authorization systems or their components can be reduced, which consequently enables a more resource-efficient design of such wireless authorization systems.

In a further advantageous embodiment, the authorization signal is repeatedly transmitted several times by the second object, and/or the input signal is received over a plurality of repetitions and the inventive method is carried out several times, in particular the input signal is sampled several times according to the inventive method and the actual values of the at least one signal characteristic are compared with the target relation and the deviation determined by the comparison is compared with the predefined tolerance in at least one, in particular in a plurality, in particular in a large number, of repetitions.

Furthermore, the object according to the invention is also solved by a wireless authorization system with a first transceiver in and/or on a first object and a second transceiver in and/or on a second object, wherein the wireless authorization system is designed to transmit from the first to the second transceiver a plurality of symbols and/or chips encoded with a first symbol or chip rate in at least one first analogue data signal and to transmit from the second to the first transceiver a plurality of symbols and/or chips encoded with a second or the first symbol or chip rate in at least one second analogue data signal, wherein the wireless authorization system is designed to take samples of actual values of at least one change in at least one signal characteristic over the progression in time of an input signal, in particular a second analogue data signal, received at the first transceiver in a wireless communication between the first and second transceiver, and furthermore is designed for comparison of the actual values of the samplings with at least one target relation for determining at least one deviation, wherein the at least one signal characteristic is and/or includes an amplitude and/or phase wherein the wireless authorization system is designed a. to interpret the input signal as an attack and/or as a signal foreign to the wireless authorization system and/or to deny the approval if the deviation is outside the at least one predefined tolerance and/or b. to interpret the input signal as a signal of the wireless authorization system and/or as an authorization signal and/or to grant an approval if the deviation is within the at least one predefined tolerance; wherein the wireless authorization system is designed to determine the target relation and/or the predefined tolerance exclusively based on data and/or exclusively based on signals of the wireless authorization system predefined in the wireless authorization system, in particular on the basis of a predefined change in the at least one signal characteristic over the progression in time of an authorization signal, wherein the second transceiver is designed to transmit the authorization signal such that the deviation of at least one first and at least one second actual value from the at least one target relation is within the predefined tolerance, wherein the second transceiver and/or the second object is designed to determine the authorization signal exclusively based on data predefined in the wireless authorization system and/or exclusively based on signals of the wireless authorization system, in particular of the at least one first analogue signal, wherein the second transceiver and/or the second object is designed to transmit the at least one authorization signal as part of the at least one second analogue data signal. Advantageous embodiments of the inventive wireless authorization system having an access restriction device, said access restriction device being designed to grant or deny access, in particular by means of an access restriction means, said access restriction device being designed to deny access if the deviation of the actual values of the input signal is outside the at least one predefined tolerance, and/or to grant access if the deviation of the actual values of the input signal from the target relation is within the at least one predefined tolerance and in which the second transceiver is designed to transmit the authorization signal to the first transceiver such that if the deviation in the actual values of the input signal from the target relation lies within the at least one predefined tolerance. Furthermore, advantages and embodiments of the method according to the invention can be transferred in the same way to the inventive wireless authorization system and vice versa.

The inventive wireless authorization system for detecting and analysing a received input signal in a wireless communication is designed to take samples of actual values of at least one change in at least one signal characteristic over the progression in time of an input signal, in particular a second analogue data signal, received at the first transceiver in a wireless communication between the first and second transceiver, and furthermore to compare the actual values of the samplings with at least one target relation for determining at least one deviation, wherein the at least one signal characteristic is and/or includes an amplitude and/or phase. Furthermore, the wireless authorization system is designed to detect an attack or to detect the input signal as a signal foreign to the wireless authorization system and/or to deny an approval based on the comparison of the at least one deviation with the predefined tolerance determined by a comparison of the actual values for the at least one signal characteristic of the input signal with the target relation. In particular, the input signal is interpreted as an attack and/or as a signal that is foreign to the wireless authorization system, and/or an approval is denied if the at least one deviation determined by the comparison is outside the predefined tolerance. Furthermore, the receiver module is designed in particular to interpret the input signal as an authorization signal and/or a signal known to the wireless authorization system and/or to grant an approval if the at least one deviation of the input signal determined by the comparison is within the predefined tolerance.

The object is thus achieved by in particular by a wireless authorization system having a first transceiver in and/or on a first object and a second transceiver in and/or on a second object, with the wireless authorization system being designed to transmit from the first to the second transceiver a plurality of symbols and/or chips encoded with a first symbol or chip rate in at least one first analogue data signal and/or to transmit from the second to the first transceiver a plurality of symbols and/or chips encoded with a second or the first symbol or chip rate in at least one second analogue data signal. The wireless authorization system is thereby designed to detect and analyse an input signal, in particular a second analogue data signal, received at the first transceiver in a wireless communication between the first and second transceivers, and is designed to take samples of actual values of at least one change in at least one signal characteristic and is designed to determine the at least one deviation by a comparison of the actual values with the target relation and to compare the determined at least one deviation of the input signal with at least one predefined tolerance, with the wireless authorization system being designed to interpret the input signal as an attack and/or as a signal foreign to the wireless authorization system and/or to deny the approval if the at least one deviation is outside the at least one predefined tolerance and/or to interpret the input signal as a signal of the wireless authorization system and/or to grant the approval if the at least one deviation is within the at least one predefined tolerance.

The wireless authorization system is thereby designed to determine the target relation and/or the predefined tolerance purely on the basis of data and/or signals of the wireless authorization system predefined in the wireless authorization system, in particular on the basis of a predefined change in the at least one signal characteristic over the progression in time of an authorization signal. This can be, for example, a stored code and/or a stored ID. For example, an ID stored in the second object and information received from the first object can also be used together to determine information to be encoded in the authorization signal and to generate the authorization signal accordingly. The second object is advantageously designed to operate in this way.

According to the invention, the second transceiver is designed to generate and/or transmit the at least one authorization signal such that the deviation of at least one first and at least one second actual value of the at least one authorization signal, in particular of an authorization signal received at the first transceiver as an input signal, from the at least one target relation is within the at least one predefined tolerance.

In particular, the second transceiver is designed to determine the at least one authorization signal exclusively on the basis of data predefined in the wireless authorization system and/or on the basis of signals of the wireless authorization system, in particular of the at least one first analogue signal. The release signal can therefore be generated according to an instruction stored on the second transceiver and/or the second object, in particular a key, and/or can be generated on the basis of a signal generated by the wireless authorization system, in particular the first transceiver and/or first object, and received by the second transceiver and/or second object, in particular a key. In particular, no external information is used to generate the authorization signal that is not based on predefined data stored in the wireless authorization system or generated on the basis of such data by the method by the wireless authorization system. In particular, the authorization signal is not based on signals foreign to the wireless authorization system and/or on environmental signals.

Furthermore, the second transceiver and/or the second object is designed to transmit the at least one authorization signal as part of the at least one second analogue data signal and, in particular, to encode information, in particular digital information, in a plurality of symbols and/or chips in the authorization signal.

Advantageous embodiments of the method can advantageously be transferred to the system, in particular by means of a corresponding configuration of the system, in particular of the first and/or second transceiver.

In particular, the inventive system is designed to implement a method according to the invention.

In particular the second object is a transceiver. The second object and/or the second transceiver of the method, device and/or system is designed in particular as a key fob. In particular, the system is designed and/or the inventive method is implemented in such a way that the authorization signal is transmitted in response to the reception of a first data signal at the second object and/or transceiver. In particular, the system is designed and/or the inventive method is implemented in such a way that a first data signal is transmitted by the first object and/or first transceiver when a person is detected approaching the first object and/or the first transceiver or a part firmly, but not necessarily rigidly, connected thereto, such as a door, door handle, access restriction means and/or barrier. In particular the first object and the second object are two completely separate objects. In particular, the system is designed and/or the inventive method is implemented in such a way that an ID and/or a code word is symbol-encoded and/or chip-encoded in the authorization signal. In particular, the code word is also determined at least on the basis of information received from the first object in a wireless signal, in particular a first analogue data signal, in symbol-encoded and/or chip-encoded form. In particular, the second object and/or the second transceiver is designed accordingly.

The authorization signal, in particular together with the at least one first analogue data signal, is advantageously used to measure the distance between the first and second objects and/or between the first and second transceivers and/or between their antennae. In particular the system is configured accordingly.

Similarly, the object of the invention is achieved by a wireless authorization system comprising an access restriction device comprising a wireless authorization system with a first transceiver in and/or on a first object and a second transceiver in and/or on a second object, wherein the wireless authorization system is designed to transmit from the first to the second transceiver a plurality of symbols and/or chips encoded with a first symbol or chip rate in at least one first analogue data signal and to transmit from the second to the first transceiver a plurality of symbols and/or chips encoded with a second or the first symbol or chip rate in at least one second analogue data signal, wherein the wireless authorization system is designed to take samples of actual values of at least one change in at least one signal characteristic over the progression in time of an input signal, in particular a second analogue data signal, received at the first transceiver in a wireless communication between the first and second transceiver, and furthermore is designed for comparison of the actual values of the samplings with at least one target relation for determining at least one deviation, wherein the at least one signal characteristic is and/or includes an amplitude and/or phase wherein the wireless authorization system is designed a. to interpret the input signal as an attack and/or as a signal foreign to the wireless authorization system and/or to deny the approval if the deviation is outside the at least one predefined tolerance and/or b. to interpret the input signal as a signal of the wireless authorization system and/or as an authorization signal and/or to grant an approval if the deviation is within the at least one predefined tolerance; wherein the wireless authorization system is designed to determine the target relation and/or the predefined tolerance exclusively based on data and/or exclusively based on signals of the wireless authorization system predefined in the wireless authorization system, in particular on the basis of a predefined change in the at least one signal characteristic over the progression in time of an authorization signal, wherein the second transceiver is designed to transmit the authorization signal such that the deviation of at least one first and at least one second actual value from the at least one target relation is within the predefined tolerance, wherein the second transceiver and/or the second object is designed to determine the authorization signal exclusively based on data predefined in the wireless authorization system and/or exclusively based on signals of the wireless authorization system, in particular of the at least one first analogue signal, wherein the second transceiver and/or the second object is designed to transmit the at least one authorization signal as part of the at least one second analogue data signal; with the access restriction device being designed a. to deny access if the deviation in the actual values of the input signal from the target relation lies outside the at least one predefined tolerance, and/or b. to grant access if the deviation in the actual values of the input signal from the target relation lies within the at least one predefined tolerance, said access restriction device being designed to grant and/or deny access, in particular by means of an access restriction means, with said access restriction device being designed to deny access if the input signal is interpreted as an attack or a signal foreign to the wireless authorization system and/or if the at least one deviation of the actual values of the input signal with respect to the at least one signal characteristic determined over the progression in time by comparison with the target relation is outside the predefined tolerance, and/or to grant access if the input signal is interpreted as an authorization signal and/or a signal known to the wireless authorization system and/or if the at least one deviation of the actual values of the input signal with respect to the at least one signal characteristic over the progression in time, determined by comparison with the target relation, is outside the predefined tolerance.

Furthermore, the inventive wireless authorization system can be designed to implement an inventive method. To this end, the method or the wireless authorization system has, in particular, a control unit designed to control the inventive wireless authorization system in a method according to the invention in accordance with the inventive method.

Furthermore, the inventive method can be performed in particular by means of an inventive wireless authorization system.

BRIEF DESCRIPTION OF THE DRAWINGS

The following, purely exemplary description of the purely exemplary and schematic figures contributes to a better understanding of the invention, in particular of the inventive method.

Here, the figures show:

FIG. 6 an illustration of experience values obtained from the calibration data in FIG. 5 in the form of discrete target values and a confidence interval with regard to.

DETAILED DESCRIPTION

Figure 1:
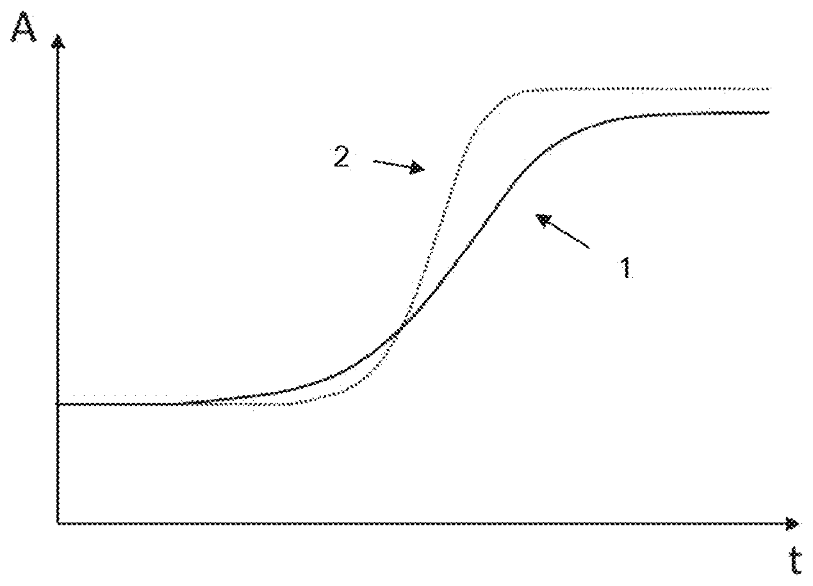
FIG. 1 an illustration of an authorization signal and an attack signal comparing their change in signal amplitude over the progression in time.

FIG. 1 shows the amplitude curve of an authorization signal 1 (continuous line) and an attack signal 2 (dotted line), which can be detected as input signals in a wireless authorization system, in particular in an inventive wireless authorization system. The attack signal is a signal foreign to the wireless authorization system that can originate, for example, from an “early detect/late commit” attack. The signal amplitudes A of the two signals against time t is shown for both signals. It can be seen that the edge of the attack signal 2 is compressed over the progression in time compared with the authorization signal 1. The rise in signal amplitude generally starts later in the attack signal 2 compared with the authorization signal 1, but reaches its signal maximum ‘earlier’. This is characteristic in particular of, for example, “early detect/late commit” attacks. Attack signals 2 often have higher maximum signal amplitudes compared with authorization signals 1, especially in the case of such “early detect/late commit”. FIG. 1 shows that the attack signal 2 and its amplitude rises faster than the authorization signal 1 and its amplitude. This differing behaviour over the progression in time of the signals is used in a special way in the inventive method to detect the attack. It should also be emphasised that a higher maximum signal amplitude of an attack signal 2 is not essential for detecting input signals as attack signals, so that detection using the inventive method is also possible if the maximum signal amplitude of the attack signal 2 corresponds to that of the authorization signal 1, or detection is possible regardless of any relative differences in maximum signal amplitude.

Figure 2:
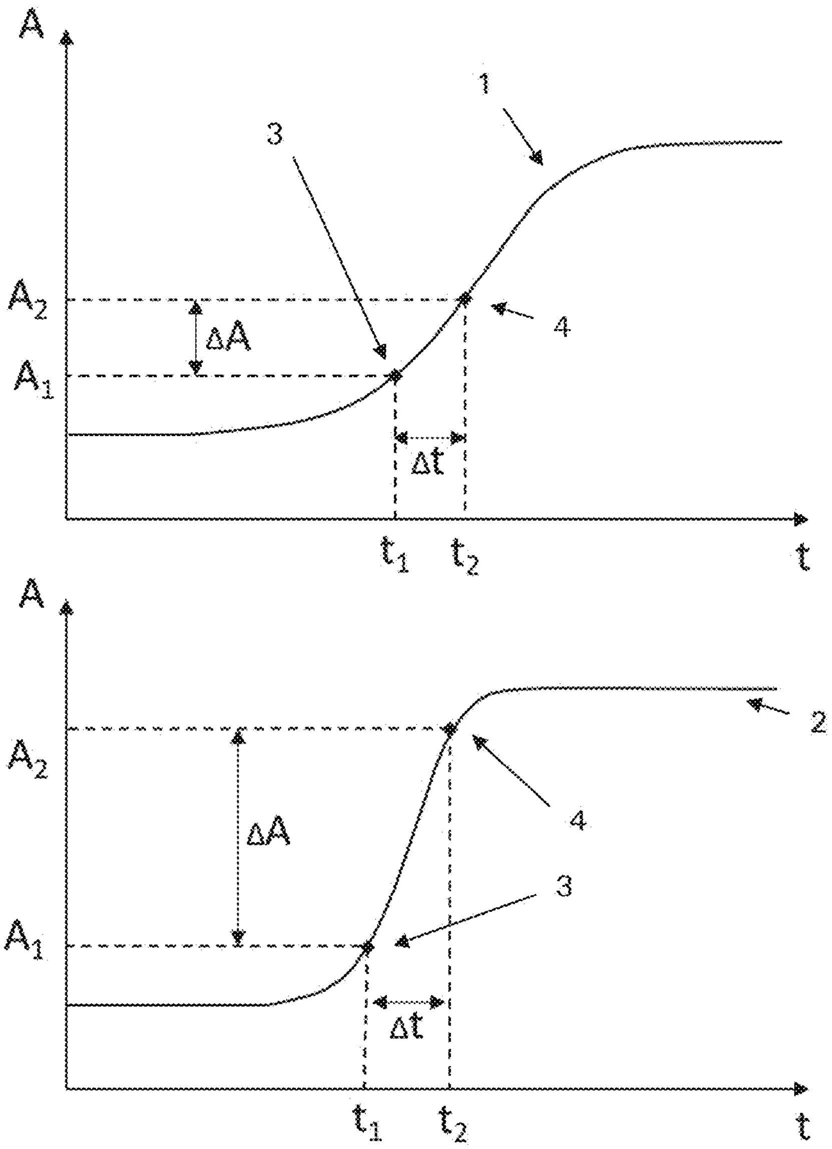
FIG. 2 a schematic representation of an inventive method comprising a first and a second sampling of the authorization signal (top) and of the attack signal (bottom) from FIG. 1 with measurement of absolute measured values of the amplitude.
Figure 3:
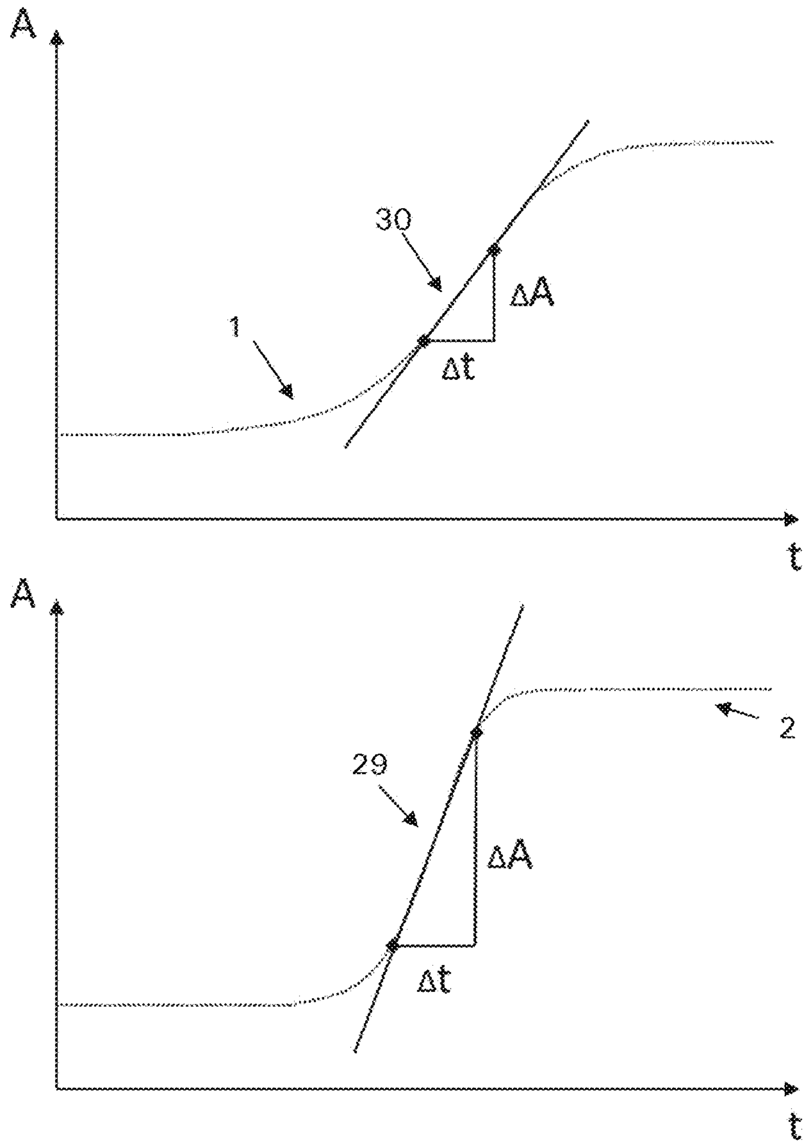
FIG. 3 a schematic representation of an alternative embodiment of the inventive method according to FIG. 2 with determination of relative measured values for the amplitude.
Figure 4:
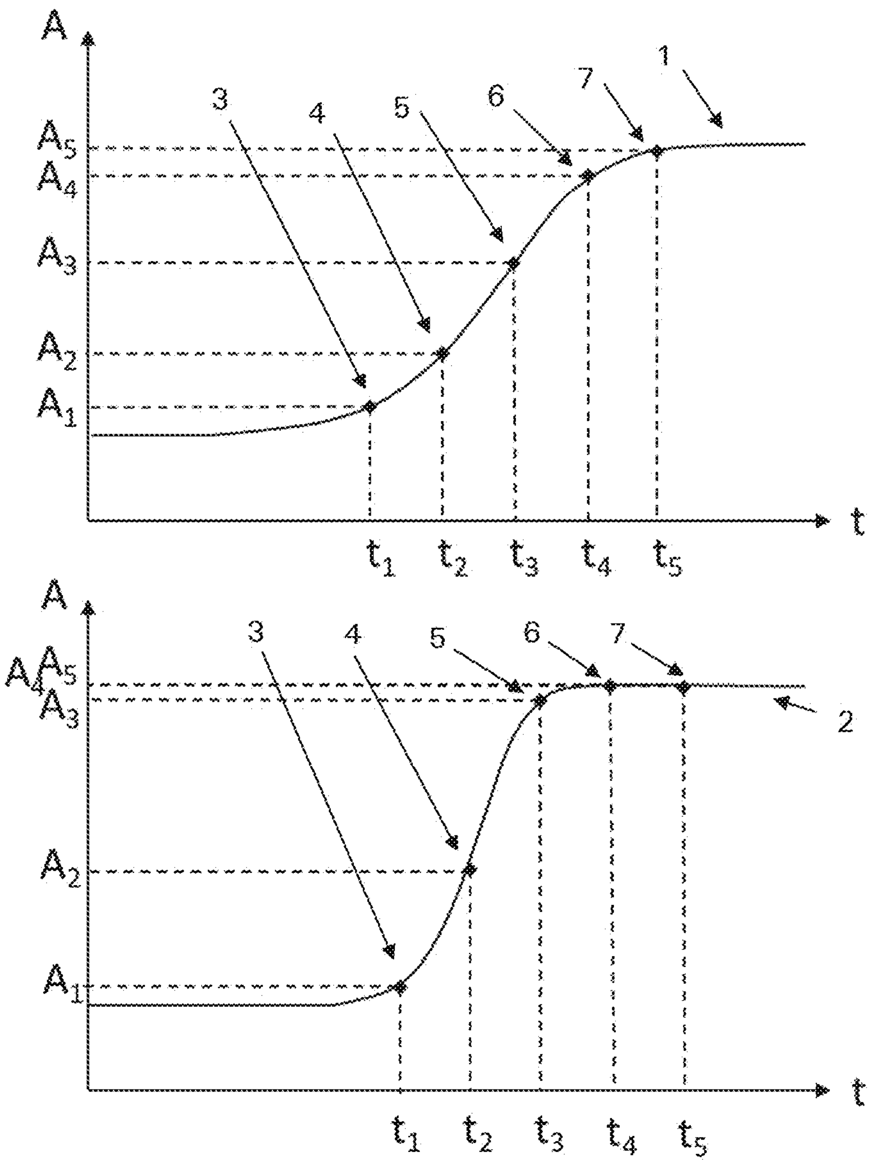
FIG. 4 an illustration of an advantageous development of the inventive method comprising more than two samplings each along a signal edge of the authorization signal (top) and the attack signal (bottom) from FIGS. 1 to 3.

As shown in FIGS. 2 to 4, at least one sample 3 is taken at a point in time t1 as an inventive first sampling and a further sample 4 is taken at a point in time t2 as an inventive second sampling on a single signal edge of an input signal in order to carry out the inventive method. In FIG. 2 here, these samplings 3,4 are shown for cases in which the input signal is the authorization signal 1 (top) or the attack signal 2 (bottom). Here t1 and t2 are chosen to be equidistant in time for both signals. In the first sampling the amplitudes A1 and in the second sampling the amplitudes A2 are recorded in each case as absolute measured values. The other steps of the inventive method for granting or denying an approval can be carried out on the basis of these measured values.

In the present case the points in time t1 and t2 for the two input signals 1,2 are not the same point in time in the signal curve, but can possibly be temporally offset from one another, but have the same time gap Δt relative to one another. The point in time t1 can here be selected at random in each case. The point in time t1 is preferably defined, in particular by the wireless authorization system, by the fact that a regular scan takes place and the point in time of such a scan is selected at which a significant signal amplitude is measured at the first object, i.e. a value for the signal amplitude is detected that deviates significantly from the background noise of the receiver. The point in time t2 is then selected with a time gap Δt, in particular a fixed time gap, relative to point in time t1. The exact temporal position of points in time t1 and t2 is not relevant here, at least as long as both points in time lie within a single signal edge of the signal being considered. Consequently, however, the time gap Δt should preferably be selected so that it is shorter than the expected duration of the signal rise of an attack signal 2, but at least shorter than the duration of the signal edge of an authorization signal 1, preferably, in particular with equidistant time sampling, especially with several scans of the signal edge (see also FIG. 4), less than one third of the duration of the signal edge of the authorization signal 1. It should be pointed out that in a real application of the inventive method, the time gap Δt shown is generally selected or should be selected shorter than that selected here for reasons of visualisation.

In this case t1 was determined by the fact that the amplitude A reached the (absolute) value A1 during the progression in time. Alternatively, however, it is also possible that a first rise in the signal amplitude above a threshold value represents a trigger point and the wireless authorization system subsequently selects the first sampling 3 as the first actual value.

The (absolute) values A2 are then measured for the amplitude A at the point in time t2, in particular taking into account the time gap Δt as the time difference between t1 and t2. In the example shown, the amplitude values A2 of the authorization signal 1 and the attack signal 2 differ significantly from one another. The inventive method uses this difference between the signals to detect an attack or to deny an approval (this is explained in more detail with reference to FIGS. 8 to 10), in particular even if any encoded information required for the approval is correctly contained in the input signal.

In addition, or as an alternative to FIG. 2, FIG. 3 shows the observation of relative values for the amplitude A. In FIG. 3, a rate of change is determined as the quotient of the amplitude change AA and the time gap Δt using a gradient triangle for the signals from FIG. 2. It can be seen that the straight line 29 resulting from the gradient triangle for the attack signal 2 (bottom) is significantly steeper compared with the straight line 30 for the authorization signal 1 (top). Alternatively, instead of the rate of change, especially if a constant Δt is selected, ΔA can also be determined as the difference |A2−A1| or as the ratio A2/A1 of the measured values for the amplitude A of the two samplings 3,4. In such determinations, too, the difference or ratio for the attack signal 2 is larger than that for the authorization signal 1.

FIG. 4 shows an advantageous embodiment of the inventive method. By comparison with FIGS. 2 and 3 and in addition to the two samplings 3,4 already described, FIG. 4 shows as an example further samplings 5,6,7 out in the form of a third sampling 5, fourth sampling 6 and fifth sampling 7. These samplings 3,4,5,6,7 can be used to compile a large number of sampling pairs from the inventive first and second sampling, each of which can be considered individually. Advantageously, an authorization signal is already denied or the signal is detected as foreign if a significant deviation from an authorization signal is detected in one of the sampling pairs (see also FIGS. 8 and 10 and the associated description of the figures).

Looking at the examples of samplings shown in FIG. 4, which are each equidistant in time, the advantages of the method using a plurality of measurements become apparent. For example, if a sampling pair is formed from the samplings 5 and 6 for the attack signal 2, this leads to a target value for the sampling 6 on the basis of a "look-up" (the "look-up" is explained further in connection with FIGS. 5 to 10) on the basis of the sampling 5, which, if the authorization signal 1 is considered, will be very similar to the sampling 7 on the basis of a look-up of the sampling 6. It is therefore difficult according to the invention to distinguish between attack signal 2 and authorization signal 1 at this point in the signal curve. In order to make a decision possible, the tolerance must be selected very small, which can, however, lead to an excessive number of denials, as the influences of different transmission conditions can then also lead to the tolerance being exceeded.

If other possible sampling pairs of the attack signal are considered, however, significant deviations from the target relation based on an authorization signal occur for such pairs, for example for pairs which are each formed from samplings 3 and 5 as inventive first and second samplings. This can be easily recognised if we consider that the amplitudes A1 of the authorization signal 1 and the attack signal 2 are similar, while the amplitudes A3 show a significant deviation from one another.

The consideration of a pair of samplings is always problematic when the amplitude change within the time gap is particularly small, usually at the beginning and end of the rise in amplitude in a signal edge. The points in time for inventive first and second samplings must be selected advantageously in particular such that the samplings are taken in the middle region of the signal edge or the middle region comprises the samplings and are therefore taken in a region of the signal edge in which a high rate of change in amplitude tends to be observed. However, the expected temporal compression of signals foreign to the wireless authorization system must also be taken into account, which results in samplings being advantageously taken early during the time of the signal rise of a signal edge.

Figure 5:
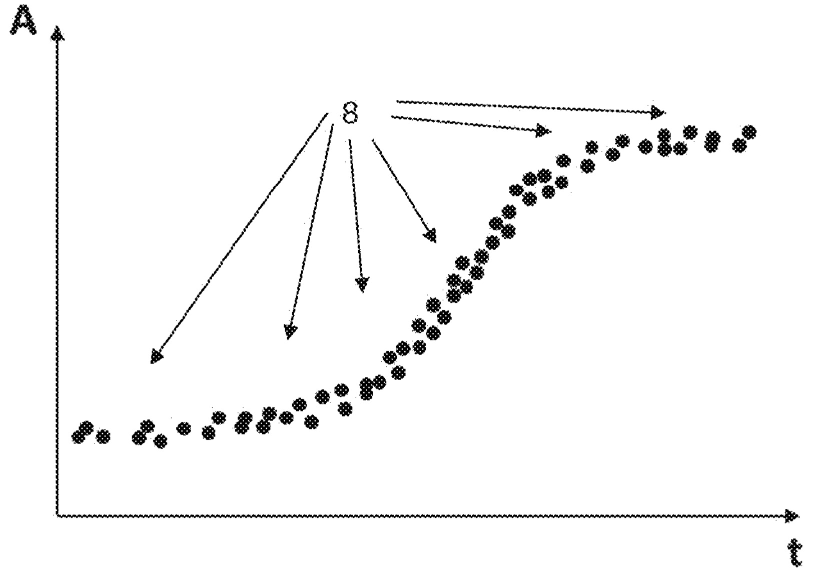
FIG. 5 an illustration of calibration data derived from a measurement of a plurality of authorization signals.
Figure 6:
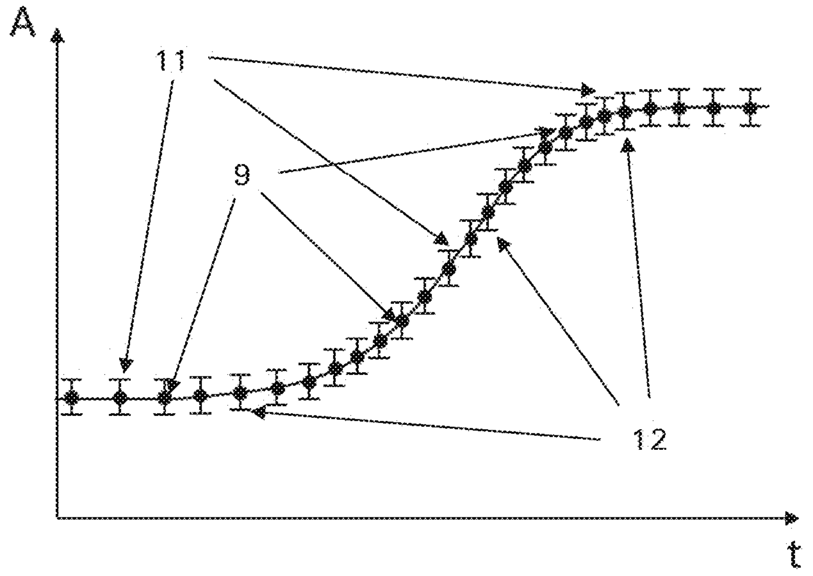
Figure 7:
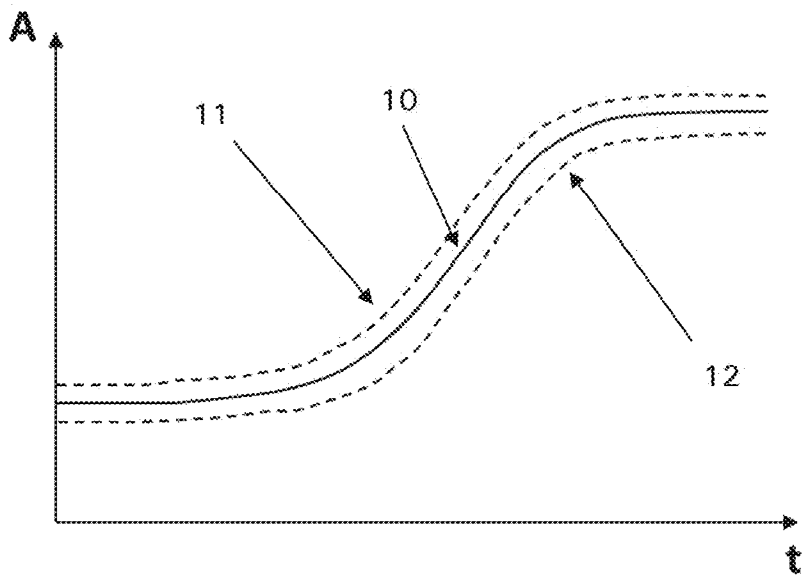
FIG. 7 A representation of the experience value function obtained from the calibration data in FIG. 5 in the form of continuous target values and a confidence interval with regard to or rather a target value range.

FIGS. 5 to 7 illustrate a calibration according to the invention, which can be carried out to perform an inventive method in an inventive wireless authorization system. FIG. 5 shows a point cloud of calibration data 8 that can be used for calibration. It should be noted in particular that the baseline as well as the maximum amplitude values are also subject to fluctuations, in particular, for example, due to background noise of the receiver used or due to different external influences when measuring the calibration data B. The calibration data originate from, in particular, multiple measurements of authorization signals. These measurements of calibration data can be stored in an inventive wireless authorization system, in particular within a secure environment, for example before the sale or delivery of such a system, in particular also during retrofitting of existing systems. In particular, this calibration data can subsequently also be extended and/or replaced by the measured values of the authorization signal detected by means of the inventive method, in particular during operation of the wireless authorization system. The initial calibration data and 'new' calibration data can be included in the calibration data, in particular with weighting, for example with regard to the date of origin, in order, for example, to be able to adapt the calibration, in particular if there is a deterioration in the components used in the wireless authorization system, for example due to ageing.

Using statistical methods, such as mean value, median, quartile, quantile, confidence interval, confidence range, variance and/or standard deviation, both discrete (see FIG. 6) experience values 9 and continuous experience values 10 (see FIG. 7) for authorization signals can be derived from this calibration data 8, which are then stored as an experience value table or experience value function on an inventive wireless authorization system. Both the experience value table and the experience value function image the expected progression in time of an authorization signal and are used to determine the target relation in the form of target expected value ranges or expected values for the amplitude of an inventive second sampling and/or target difference, target ratio and/or target rate of change between the amplitudes of the inventive second sampling and the associated inventive first sampling.

In addition, an inventive tolerance can also be determined on the basis of the calibration data, in particular also with the aid of and/or taking into account the statistical methods already mentioned. In FIG. 6, this is shown as an error bar with the tolerance limits 11,12. In the case of continuous expected values, as can also be seen in FIG. 7 (see dotted line), a function for the upper 11 and lower tolerance limit 12 is also obtained for the predefined tolerance.

When determining or selecting the tolerance limits 11,12, the fluctuations inherent in the wireless authorization system with regard to the system's own authorization signals must also be taken into account in particular, so that authorization signals or signals of the wireless authorization system are not incorrectly interpreted as being foreign to the system. These fluctuations can depend in particular on external influences such as temperature, but also on the frequencies of the signals used, as well as on the quality and ageing of system components and ambient influences.

In the event that the target relation is determined by a target expected value range, the target expected value range can already at least partially include the fluctuations described in an analogue manner. In addition, the target expected value range can also be extended by the predefined tolerance, with the predefined tolerance then enclosing the target expected value range, thereby forming a common confidence interval. However, the same confidence interval can also be obtained if, instead of a target expected value range, a target expected value is used that has a correspondingly larger tolerance. Both methods can therefore lead to an identical result with regard to the confidence interval, even if the individual steps of these embodiments of the inventive method differ. In this respect, the variants target expected value plus predefined tolerance and target expected value range plus predefined tolerance for the confidence interval can be regarded as equivalent when considering a single pair, and can lead to the same or an identical confidence interval. In particular, a target expected value range can also be understood to be analogous to a combination of target expected value and predefined tolerance.

However, in the case of more than two samplings, it is also possible to initially carry out the comparison in pairs for an inventive first and second sampling and to consider the individual deviations determined for all samplings combined in pairs together as a total deviation or an average deviation of these deviations and to use these for comparison with the predefined tolerance. If, in particular, a target expected value range is used as the target relation for the individual paired samplings, the target expected value range and predefined tolerance do not coincide.

Figure 8:
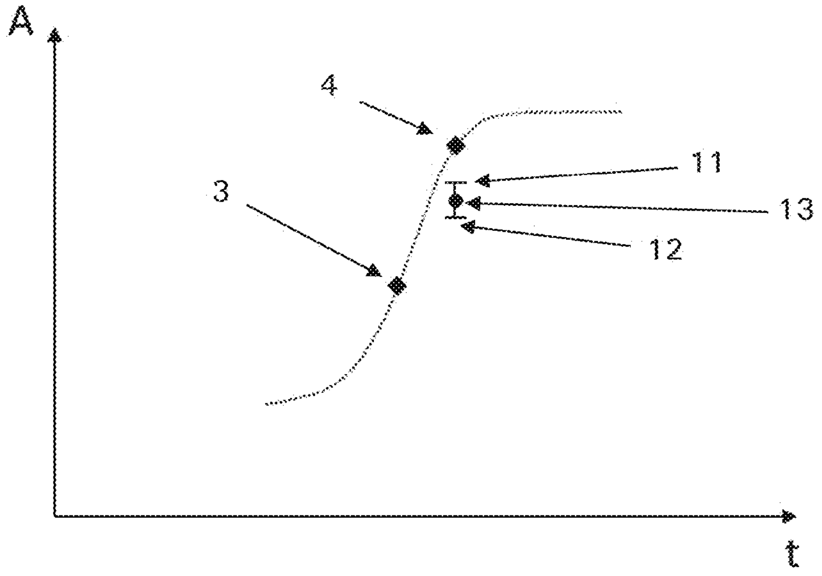
FIG. 8 A schematic representation of an attack signal measured as an input signal comprising a first sampling, a prediction of a target expected value based on the first sampling and a second sampling.

FIG. 8 shows a schematic representation of an attack signal 2 measured as an input signal comprising a first sampling 3, a prediction of a target expected value 13 based on the first sampling 3 and a second sampling 4. The target expected value 13 is determined on the basis of the amplitude of the first sampling 3 from the experience value table or experience value function by analogy with FIG. 6 or 7. Within the inventive method, a comparison is made with the value for the amplitude determined in the second sampling 4. It can be clearly seen that the amplitude of the second sampling 4 deviates significantly from the target expected value 13. This deviation is furthermore outside the tolerance limits 11,12 around the target expected value 13. The inventive wireless authorization system subsequently interprets the received input signal 2 as a signal that is foreign to the wireless authorization or as an attack and consequently denies the approval.

It should be noted that, although an example was chosen in which the signal characteristic is an amplitude, the illustrations in FIGS. 1 to 8 are equally valid—with appropriate adaptations—for methods in which a phase is considered as signal characteristic instead of the amplitude.

Figure 9:
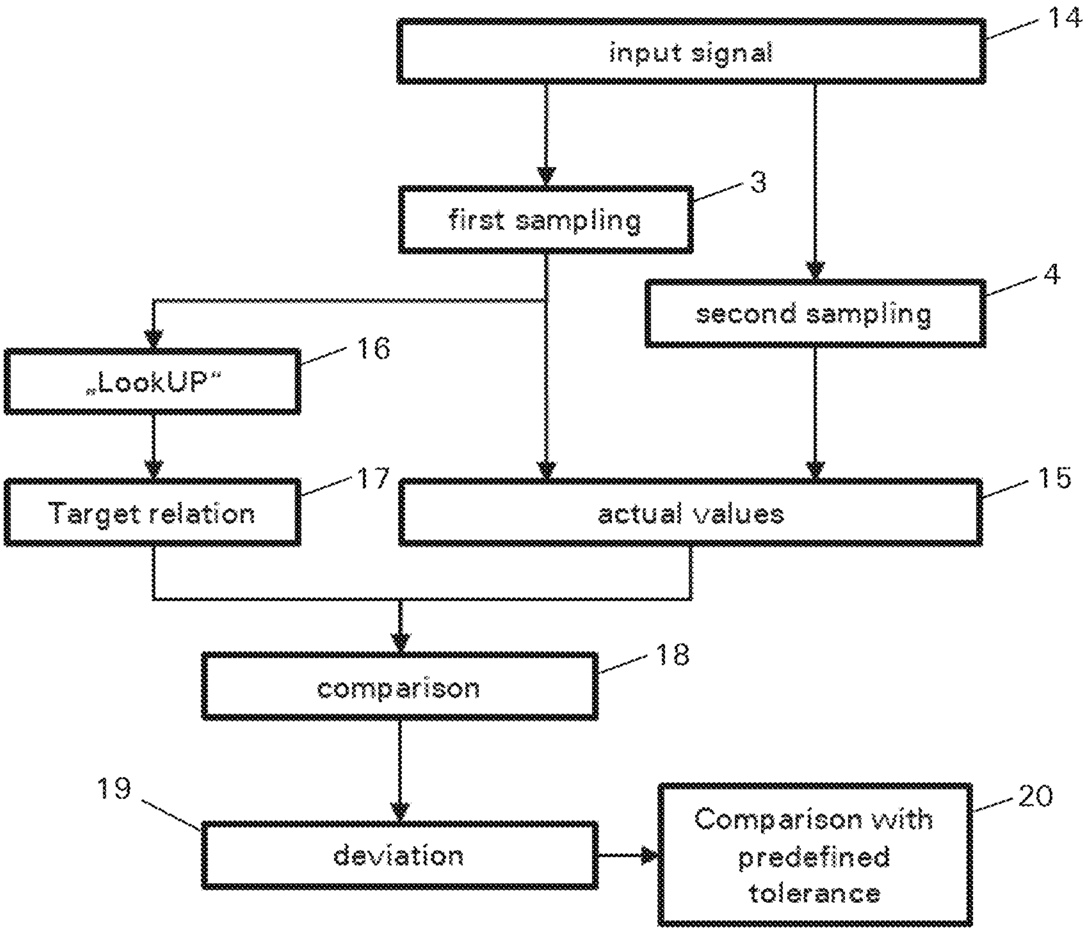
FIG. 9 a schematic representation of the individual process steps of a process according to the invention.

FIG. 9 shows a schematic representation of individual process steps of a method according to the invention as a block diagram. First an input signal 14 is received by the wireless authorization system, in particular by a first object. The first sampling 3 and the second sampling 4 are then performed on the input signal 14. The samplings 3,4 are used to determine actual values 15 for at least one signal characteristic, in particular amplitude and/or phase, over the progression in time of the input signal 14. The actual value of the first sampling 3 is furthermore used in the "look-up" 16. In the "look-up" 16, a target relation 17 is assigned to the actual value of the first sampling 3. The target relation 17 is then compared with the actual values 15 from the samplings 3,4. This comparison 18 determines the deviation 19, which is then compared with the predefined tolerance 20. On the basis of the comparison of deviation 19 and tolerance 20, the wireless authorization system can subsequently determine whether the signal is a foreign signal and therefore an approval is to be denied.

Figure 10:
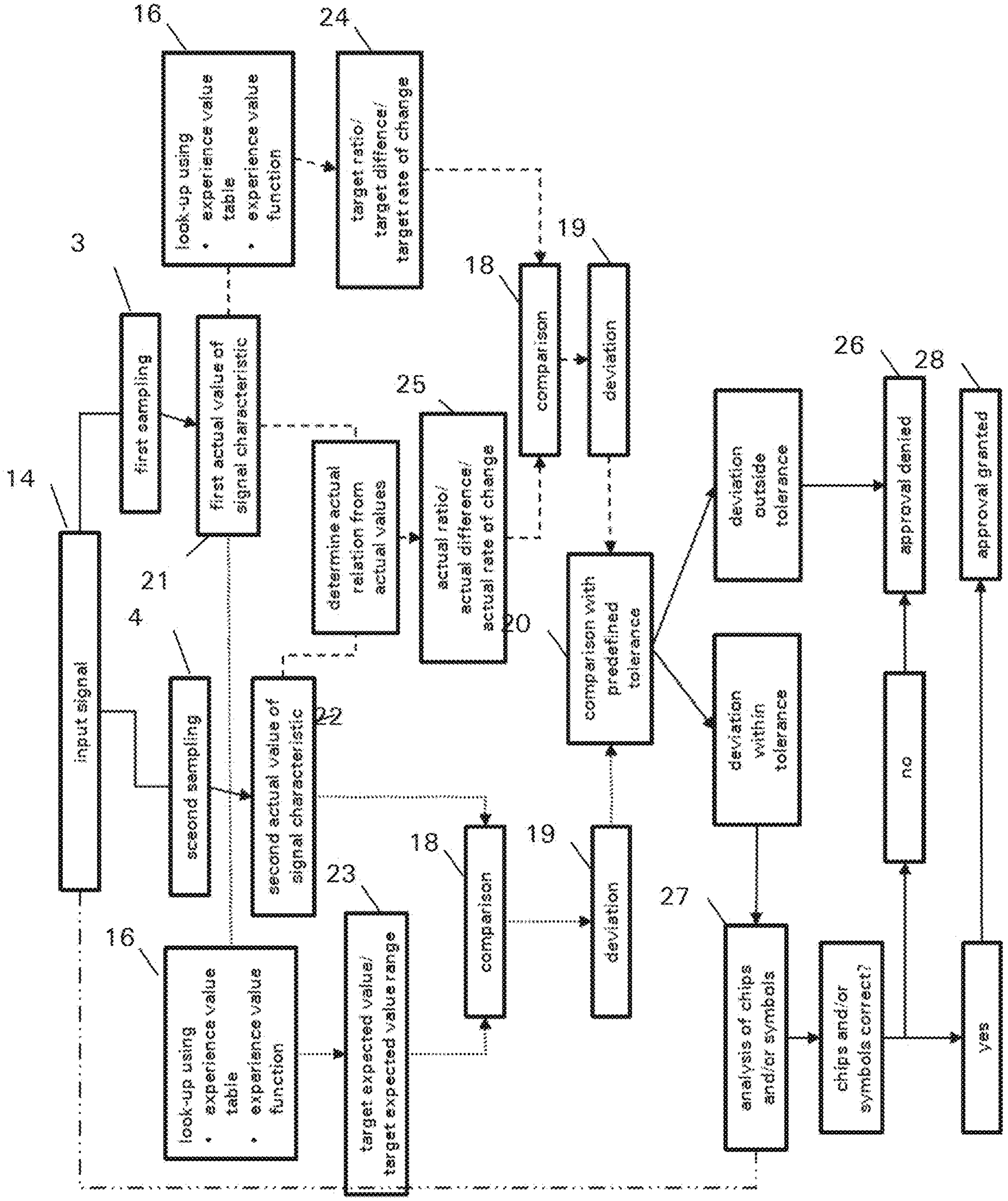
FIG. 10 a detailed illustration of two advantageous embodiments of the method of FIG. 9 with the addition of an analysis of the input signal with regard to information encoded therein.

FIG. 10 shows in detail two advantageous embodiments of the method shown in FIG. 9, with these being indicated by the different shapes of the connecting arrows (dashed and dotted). The first sampling 3 and second sampling 4 of the input signal 14 is carried out by analogy with FIG. 9 or by analogy with the method in FIGS. 2 to 4, to determine the first actual value 21 of the signal characteristic, in particular amplitude and/or phase, and the second actual value 22 of the signal characteristic, in particular amplitude and/or phase.

In the first variant, represented by the dotted arrows, an absolute target value 23, in particular a target expected value range or a target expected value, is determined as a target relation from a first actual value 21 of the first sampling 3 by prediction using an experience value table or experience value function as a "look-up" 16. The second actual value 22 is compared 18 with the absolute target value 23 to determine the deviation 19. In the second variant, represented by the dashed arrows, a relative target value 24, in particular a target ratio, a target difference and/or target rate of change, is determined for the target relation from a first actual value 21 of the first sampling 3 by prediction using an experience value table or experience value function as a "look-up" 16. In addition, an actual relation 25, in particular an actual ratio, an actual difference and/or an actual rate of change, is determined from the first actual value 21 and the second actual value 22, which is then compared with the relative target value 24. This comparison 18 determines the deviation 19.

The experience value tables and/or experience value functions used in both variants can be determined by analogy with FIGS. 5 to 7. Furthermore, in both variants the determined deviation 19 is compared with the predefined tolerance 20. The predefined tolerance can also be determined by analogy with FIGS. 5 to 7.

If the deviation is outside the predefined tolerance, the input signal 14 is detected or interpreted as a signal that is foreign to the wireless authorization system and the approval 26 is denied.

If the deviation is within the predefined tolerance, the input signal 14 is not interpreted as a signal foreign to the wireless authorization system. Subsequently, an analysis 27 of the information encoded in the input signal 14, in particular in the form of symbols and/or chips, is triggered for which the input signal and its information content is used (see dashed-dotted line). If the analysis of the information indicates that the information is correct, the approval is granted 28. Otherwise the approval is denied 26.

The analysis of the progression in time of the signal characteristic of the input signal 14 according to the inventive method and the analysis 27 of the information contained in the input signal can also be carried out in reverse order or simultaneously.

| Reference numbers: | |
|---|---|
| 1 | Authorization signal |
| 2 | Attack signal |
| 3 | Sampling |
| 4 | Sampling |
| 5 | Sampling |
| 6 | Sampling |
| 7 | Sampling |
| 8 | Calibration data |
| 9 | Discrete experience values |
| 10 | Continuous experience values |
| 11 | Upper tolerance limit |
| 12 | Lower tolerance limit |
| 13 | Target expected value |
| 14 | Input signal |
| 15 | Actual values |
| 16 | Look-up |
| 17 | Target relation |
| 18 | Comparison |
| 19 | Deviation |
| 20 | Predefined tolerance |
| 21 | First actual value |
| 22 | Second actual value |
| 23 | Absolute target value |
| 24 | Relative target value |
| 25 | Actual relation |
| 26 | Approval denied |
| 27 | Analysis of the encoded information |
| 28 | Approval granted |
| 29 | Straight line |
| 30 | Straight line |

The invention claimed is:

1. A method for deciding on the effecting of an approval in a wireless authorization system comprising at least one first and one second object, with said decision on the effecting of the approval being based on at least one change of at least one signal characteristic over a progression in time of a received input signal received at the at least one first object, each one of the said at least one signal characteristic being or including an amplitude or a phase, said wireless authorization system being designed to transmit a plurality of symbols or a plurality of chips with a first symbol or chip rate encoded in an at least one first analogue data signal from the at least one first object to the second object or from the second object to the at least one first object, and to effect the approval through an authorization signal from the second object to the at least one first object, said authorization signal having at least one predefined change in the at least one signal characteristic over the progression in time and being determined by the wireless authorization system exclusively on a basis of data predefined in the wireless authorization system or on a basis of signals of the wireless authorization system and being part of the at least one first analogue data signal or exclusively on a basis of data predefined in the wireless authorization system and a basis of signals of the wireless authorization system and being part of the at least one first analogue data signal;

wherein, when the received input signal is received at the at least one first object, samplings of the at least one signal characteristic of the received input signal are taken in such a way that an at least one first sampling takes place at a first point in time and an at least one second sampling takes place at a second point in time;

wherein the at least one first sampling determines at least one first actual value for the at least one signal characteristic and the at least one second sampling determines at least one second actual value for the at least one signal characteristic;

wherein an at least one target relation is determined by the wireless authorization system exclusively based on a data predefined in the wireless authorization system or exclusively based on at least one signal of the wireless authorization system or exclusively based on a data predefined in the wireless authorization system and on at least one signal of the wireless authorization system;

wherein at least one deviation is determined by a comparison of the at least one first and at least one second actual value with the at least one target relation;

a. the received input signal is interpreted as an attack or as a signal foreign to the wireless authorization system or to deny an approval if the at least one deviation is outside a predefined tolerance or b. is interpreted as a signal of the wireless authorization system or is recognised by the wireless authorization system as an authorization signal or an approval is granted if the at least one deviation is within the predefined tolerance; and wherein the second object is designed to transmit the authorization signal in such a way that the at least one deviation of the at least one first and at least one second actual value of the change over the progression in time of the at least one signal characteristic from the at least one target relation is within the predefined tolerance.

2. The method according to claim 1, wherein the at least one target relation is determined by a target expected value range or a target expected value.

3. The method according to claim 2, wherein the target expected value range or the target expected value is a target value range or a target value for the at least one second actual value of the at least one signal characteristic expected in the at least one second sampling, or a target ratio or a target difference or a target rate of change between the at least one signal characteristic of the at least one first sampling and the at least one second sampling.

4. The method according to claim 3, wherein the target expected value range or the target expected value is assigned to the at least one first actual value by the wireless authorization system or is determined on a basis of the at least one actual value.

5. The method according to claim 4, wherein the target value range or the target value for the at least one second actual value of the at least one signal characteristic expected in the at least one second sampling is calculated from the at least one first actual value by means of the target ratio or the target difference or the target rate of change.

6. The method according to claim 1, wherein an actual relation of the change in time in the at least one signal characteristic of the received input signal over the progression in time is determined from the at least one first and the at least one second actual values and the actual relation is compared with the target relation wherein the actual relation is determined as an actual ratio or an actual difference between the at least one signal characteristic of the at least one first sampling and the at least one second sampling or as a rate of change over the progression in time of an at least one parameter of the received input signal in a time gap between the first and second points in time.

7. The method according to claim 6, wherein for the comparison of the actual relation with the target relation, the actual ratio is compared with the target ratio or the actual difference is compared with the target difference or the rate of change over the progression in time is compared with the target rate of change.

8. The method according to claim 1, wherein the target relation or the predefined tolerance is determined on a basis of at least one calibration data for the at least one predefined change in the at least one signal characteristic over the progression in time, with the at least one calibration data originating from a plurality of measured authorization signals.

9. The method according to claim 8, wherein at least one statistical parameter, is determined from the at least one calibration data and in that the at least one statistical parameter are used to determine the target relation; and wherein the at least one target relation is a target expected value range the target expected value, or the predefined tolerance.

10. The method according to claim 1, wherein the predefined tolerance is 80% or less of the change in the at least one signal characteristic in an at least one signal edge or wherein the first and second points in time have a time gap in the range from 1/16 to 1/4 of a period of a wireless signal of the wireless authorization system or the at least one first analogue data signal or in the range from 50 ns to 250 ns.

11. The method according to claim 1, wherein a plurality of samplings is carried out on the received input signal;

wherein a set of two of the plurality of samplings are an at least one pair of first and second samplings;

wherein a respective pair of the at least one pair are compared with the target relation;

wherein each of the pairs of the at least one pair are at least partially offset in time from one another in the progression in time of the received input signal.

12. A wireless authorization system with a first transceiver in or on a first object and a second transceiver in or on a second object;

wherein the wireless authorization system is designed to transmit from the first to the second transceiver a first plurality of symbols or a first plurality of chips encoded with a first symbol or a chip rate in at least one first analogue data signal and to transmit from the second to the first transceiver a second plurality of symbols or a second plurality of chips encoded with a second or the first symbol or the chip rate in at least one second analogue data signal;

wherein the wireless authorization system is designed to take an at least one sample of at least one actual value of at least one change in an at least one signal characteristic over a progression in time of a received input signal received at the first transceiver in a wireless communication between the first and second transceiver, and furthermore is designed for comparison of the at least one actual value of the plurality of samplings with an at least one target relation for determining an at least one deviation;

wherein the at least one signal characteristic is or includes an amplitude or a phase;

wherein the wireless authorization system is designed a. to interpret the received input signal as an attack or as a signal foreign to the wireless authorization system or to deny an approval if the at least one deviation is outside an at least one predefined tolerance or b. to interpret the received input signal as a signal of the wireless authorization system or as an at least one authorization signal or to grant the approval if the at least one deviation is within the at least one predefined tolerance;

wherein the wireless authorization system is designed to determine the at least one target relation or the at least one predefined tolerance exclusively based on an at least one data or exclusively based on signals of the wireless authorization system predefined in the wireless authorization system or exclusively based on an at least one data and on signals of the wireless authorization system predefined in the wireless authorization system;

wherein the second transceiver is designed to transmit the at least one authorization signal such that the at least one deviation of an at least one first and an at least one second actual value from the at least one target relation is within the at least one predefined tolerance;

wherein the second transceiver or the second object is designed to determine the at least one authorization signal exclusively based on the at least one data predefined in the wireless authorization system or exclusively based on signals of the wireless authorization system;

wherein the second transceiver or the second object is designed to transmit the at least one authorization signal as part of the at least one second analogue data signal.

13. The wireless authorization system according to claim 12, having an access restriction device, said access restriction device being designed to grant or deny access, said access restriction device being designed to deny access if the at least one deviation of the at least one actual value of the received input signal is outside the at least one predefined tolerance, or to grant access if the at least one deviation of the at least one actual value of the received input signal from the at least one target relation is within the at least one predefined tolerance.

14. The wireless authorization system according to claim 12, in which the second transceiver is designed to transmit the at least one authorization signal to the first transceiver such that if the at least one deviation in the at least one actual value of the received input signal from the at least one target relation lies within the at least one predefined tolerance.

15. An access restriction system comprising:

a wireless authorization system comprising:

a first transceiver in or on a first object and a second transceiver in or on a second object;

wherein the wireless authorization system is designed to transmit from the first to the second transceiver a first plurality of symbols or a first at least one chip encoded with a first symbol or a chip rate in at least one first analogue data signal and to transmit from the second to the first transceiver a second plurality of symbols or a second at least one chip chips encoded with a second or the first symbol or the chip rate in at least one second analogue data signal;

wherein the wireless authorization system is designed to take an at least one sample of at least one actual value of at least one change in an at least one signal characteristic over a progression in time of a received input signal received at the first transceiver in a wireless communication between the first and second transceiver, and furthermore is designed for comparison of the at least one actual value of the with an at least one target relation for determining an at least one deviation;

wherein the at least one signal characteristic is or includes an amplitude or a phase;

wherein the wireless authorization system is designed a. to interpret the received input signal as an attack or as a signal foreign to the wireless authorization system or to deny an approval if the at least one deviation is outside an at least one predefined tolerance or b. to interpret the received input signal as a signal of the wireless authorization system or as an at least one authorization signal or to grant the approval if the at least one deviation is within the at least one predefined tolerance;

wherein the wireless authorization system is designed to determine the at least one target relation or the at least one predefined tolerance exclusively based on an at least one data or exclusively based on signals of the wireless authorization system predefined in the wireless authorization system or exclusively based on an at least one data and on signals of the wireless authorization system predefined in the wireless authorization system;

wherein the second transceiver is designed to transmit the at least one authorization signal such that the at least one deviation of an at least one first and an at least one second actual value from the at least one target relation is within the at least one predefined tolerance;

wherein the second transceiver or the second object is designed to determine the at least one authorization signal exclusively based on the at least one data predefined in the wireless authorization system or exclusively based on signals of the wireless authorization system or exclusively based on an at least one data and on signals of the wireless authorization system predefined in the wireless authorization system;

wherein the second transceiver the second object is designed to transmit the at least one authorization signal as part of the at least one second analogue data signal;

wherein the access restriction device being designed a. to deny access if the at least one deviation in the at least one actual value of the received input signal from the target relation lies outside the at least one predefined tolerance, or b. to grant access if the at least one deviation in the at least one actual value of the received input signal from the target relation lies within the at least one predefined tolerance.

16. The method according to claim 4, wherein the target value rang or the target value for the at least one second actual value of the at least one signal characteristic expected in the at least one second sampling is calculated from the at least one first actual value by means of the target ratio or the target difference or the target rate of change in that, for the comparison, the calculated target value range or the target value, is compared with the actual value of the second sampling.

17. The method according to claim 8 wherein, an experience value table or an experience value function is generated on the wireless authorization system using the at least one calibration data and stored in the wireless authorization system; or wherein, an at least one initial calibration data from the plurality of measured authorization signals are supplemented or at least partially replaced by at least one data from authorization signals measured as at least one input signal.

18. The method according to claim 17, wherein supplementation or replacement is performed by use of weighting at the at least one date from the plurality of authorization signals measured as at least one input signal with regard to their time or origin.

19. The method according to claim 11, wherein the first sampling of a second of the pairs of the at least one pair corresponds to the second sampling of a first of the pairs or wherein an approval is denied if the at least one deviation of one of the pairs of the at least one pair of the plurality of samplings is outside the predefined tolerance.

20. The access restriction system according to claim 15, wherein the wireless authorization system further comprises:

having an access restriction device, said access restriction device being designed to grant or deny access, said access restriction device being designed to deny access if the at least one deviation of the at least one actual value of the received input signal is outside the at least one predefined tolerance, or to grant access if the at least one deviation of the at least one actual value of the received input signal from the at least one target relation is within the at least one predefined tolerance.

* * * * *